US012613178B2

(12) United States Patent
Timmons et al.

(10) Patent No.: US 12,613,178 B2
(45) Date of Patent: Apr. 28, 2026

(54) LINEARITY CONTROL COMPOSITIONS AND METHODS OF USE

(71) Applicant: Roche Diagnostics Hematology, Inc., Indianapolis, IN (US)

(72) Inventors: Rebecca Timmons, Framingham, MA (US); Chris Chace, East Freetown, MA (US); Louis Bonaparte, II, Plymouth, MA (US); Jaclyn Ruhl, Ballwil (CH); Lisbeth Blake, Guilford, CT (US)

(73) Assignee: Roche Diagnostics Hematology, Inc., Indianapolis, IN (US)

( * ) Notice: Subject to any disclaimer, the term of this patent is extended or adjusted under 35 U.S.C. 154(b) by 982 days.

(21) Appl. No.: 17/787,059

(22) PCT Filed: Dec. 16, 2020

(86) PCT No.: PCT/US2020/065381
§ 371 (c)(1),
(2) Date: Jun. 17, 2022

(87) PCT Pub. No.: WO2021/127026
PCT Pub. Date: Jun. 24, 2021

(65) Prior Publication Data
US 2023/0053128 A1 Feb. 16, 2023

Related U.S. Application Data

(60) Provisional application No. 62/951,581, filed on Dec. 20, 2019.

(51) Int. Cl.
*G01N 1/00* (2006.01)
*G01N 15/06* (2006.01)
(Continued)

(52) U.S. Cl.
CPC ....... *G01N 15/06* (2013.01); *G01N 2015/012* (2024.01); *G01N 15/075* (2024.01)

(58) Field of Classification Search
None
See application file for complete search history.

(56) References Cited

U.S. PATENT DOCUMENTS

| | | | |
|---|---|---|---|
| 4,959,796 A | 9/1990 | Hidaka et al. | |
| 5,308,767 A | 5/1994 | Tereshima | |
| (Continued) | | | |

FOREIGN PATENT DOCUMENTS

| | | |
|---|---|---|
| CN | 101535804 A | 9/2009 |
| EP | 0266216 A2 | 5/1988 |
| (Continued) | | |

OTHER PUBLICATIONS

EP Extended European Search Report in European Appln. No. 20901493.5, mailed on Jan. 2, 2024, 13 pages.
(Continued)

*Primary Examiner* — Jyoti Nagpaul
(74) *Attorney, Agent, or Firm* — Fish & Richardson P.C.

(57) ABSTRACT
The present disclosure provides methods and compositions for preparing linearity control slides to verify linearity of image-based hematology analyzers without the need to make such control slides over and over again for each analyzer each time the analyzer is verified.

20 Claims, 6 Drawing Sheets

(51) Int. Cl.

| | |
|---|---|
| *G01N 15/01* | (2024.01) |
| *G01N 15/075* | (2024.01) |

(56) References Cited

U.S. PATENT DOCUMENTS

| | | | |
|---|---|---|---|
| 10,764,538 B2 | 9/2020 | Winkelman et al. | |
| 2003/0008401 A1 | 1/2003 | Berndt | |
| 2008/0268494 A1 | 10/2008 | Linssen | |
| 2014/0273064 A1* | 9/2014 | Smith .............. | G01N 33/57438 |
| | | | 435/29 |
| 2019/0376878 A1 | 12/2019 | Barnes et al. | |

FOREIGN PATENT DOCUMENTS

| | | | |
|---|---|---|---|
| JP | 2007-527991 A | 10/2007 | |
| JP | 2016-511424 A | 4/2016 | |
| JP | 2019-513255 A | 5/2019 | |
| WO | WO 2008/061073 A2 | 5/2008 | |
| WO | WO 2013/090567 A2 | 6/2013 | |
| WO | WO 2019/090126 A1 | 5/2019 | |

OTHER PUBLICATIONS

JP Japanese Office Action in Japanese Appln. No. 2022-538323, 7 pages (with English translation).

CN Office Action in Chinese Appln. No. 202080088719.9, mailed on Sep. 28, 2023, 13 pages (with English translation).

CN Office Action in Chinese Appln. No. 202080088719.9, dated Mar. 18, 2023, 15 pages (with English translation).

CN Office Action in Chinese Appln. No. 202080088719.9, mailed on Feb. 8, 2024, 7 pages (with English translation).

PCT International Preliminary Report on Patentability in International Appln. No. PCT/US2020/065381, dated May 17, 2022, 9 pages.

PCT International Search Report and Written Opinion in International Appln. No. PCT/US2020/065381, dated May 27, 2021, 12 pages.

Verbrugge et al., "Verification and standardization of blood cell counters for routine clinical laboratory tests," Clinics in Laboratory Medicine, Mar. 1, 2015, 35(1):183-96.

* cited by examiner

LINEARITY CONTROL COMPOSITIONS AND METHODS OF USE

CROSS-REFERENCE TO RELATED APPLICATIONS

This application is a U.S. National Phase Application under 35 U.S.C. § 371 of International Patent Application No. PCT/US2020/065381, filed on Dec. 16, 2020, which claims the benefit of U.S. Provisional Application No. 62/951,581, filed on Dec. 20, 2019, the entire contents of which are hereby incorporated by reference.

TECHNICAL FIELD

The invention relates to linearity control compositions and the methods of use that enable confirmation of a measurable range and linearity of the measurements of image-based hematology analyzers for any one or more of white blood cell count (WBC), platelet count (PLT), red blood cell count (RBC), nucleated red blood cell count (NRBC), calculated parameters of hemoglobin (HGB) and hematocrit (HCT), and reticulocyte (RET) enumeration.

BACKGROUND

Systems, such as hematology analyzers, can be used to analyze different components of blood samples, such as RBC, WBC, HGB, HCT, PLT, RET, and NRBC. To provide accurate readings of concentrations of the different blood components in blood samples, one or more linearity control standards are processed on a system, which computes linearity factors by comparing recovered values to known values. Linearity standards are used to verify the system for a certain range of concentrations of blood components. Currently there are no commercially available hematology linearity kits or any other commercially available hematology products suitable to support validation of linearity claims for image-based hematology analyzers, such as the Cobas® m 511 integrated hematology analyzer (Roche Diagnostics), for example, as disclosed in, e.g., U.S. Pat. Nos. 9,217,695; 10,094,764; and 10,764,538. Consequently, there is a strong need to create linearity control compositions that solve this problem.

SUMMARY

This disclosure is based, at least in part, on the discovery that high and low concentration blood samples can be prepared and used to generate a new linearity material/ matrix referred to as "linearity control slides" that are stable for at least six months and can be used multiple times on different image-based hematology systems to verify the system's reportable range. This disclosure provides methods and compositions to generate the high and low concentration blood samples to make equidistant dilutions that make up the linearity control slides over a concentration range specific to the hematology analyzer and cell type.

In one aspect, the disclosure features a set of linearity control slides for verifying the analytical measuring interval (AMI) or reportable range of an image-based hematology analyzer. The set of linearity control slides include at least one, e.g., at least two, three, four, or all five, of: a first set of slides for combined red blood cell (RBC) hemoglobin (HGB) and hematocrit (HCT) components; a second set of slides for a white blood cell (WBC) component; a third set of slides for a platelet (PLT) component; a fourth set of slides for a reticulocyte (RET) component; and a fifth set of slides for a nucleated red blood cell (NRBC) component; wherein each set of slides includes three or more slides, wherein each slide in the set contains one of a series of equidistant dilutions within a range of concentrations of the blood component of that set, and wherein each set of slides is fixed and stained, e.g., by a hematology analyzer, e.g., an image-based hematology analyzer.

In some embodiments, after fixing and staining, the set is stable without refrigeration for at least six months. In some embodiments, staining comprises an eosin solution. In some embodiments, staining comprises a methylene blue solution.

In some embodiments, at least the RBC, WBC, and PLT slide sets, wherein the sets of slides include the following high concentrations and low concentrations of the respective types of cells:

| Parameter | Low Concentration Linearity Samples | High Concentration Linearity Samples |
|---|---|---|
| WBC | $\leq 0.1 \times 10^3/\mu L$<br>$>1.5 \times 10^6/\mu L$ RBC* | $\geq 400 \times 10^3/\mu L$ |
| PLT | $\leq 10 \times 10^3/\mu L$<br>$>1.5 \times 10^6/\mu L$ RBC* | $\geq 5000 \times 10^3/\mu L$ |
| RBC | $\leq 0.4 \times 10^6/\mu L$ | $\geq 8.0 \times 10^6/\mu L$ |

In another aspect, the disclosure features methods of verifying linearity of enumeration of a blood component by an image-based hematology analyzer in an extended concentration range, the method including: obtaining a set of linearity control slides as disclosed herein for one or more blood components; analyzing the set of linearity control slides with the image-based hematology analyzer using a standard protocol for each blood component; obtaining enumeration values for the blood component from the image-based hematology analyzer; determining linearity of the blood component enumeration using the enumeration values and a known target range for the blood component for the image-based hematology analyzer.

In some embodiments, the methods further include obtaining a set of linearity control slides for two or more blood components, e.g., two or more of RBC, WBC, PLT, RET, and NRBC.

In another aspect, the disclosure features methods of producing a set of linearity control slides for verifying linearity on a hematology analyzer with respect to one or more blood components. For example, the methods include: obtaining a whole blood sample or blood component from a healthy human subject; preparing a high concentration sample from the whole blood or blood product sample for a first blood component; preparing a low concentration sample from the whole blood or blood product sample for a first blood component; preparing a plurality of equidistant dilutions for the first blood component, wherein the plurality of equidistant dilutions includes, the high concentration blood or blood product sample, the low concentration blood or blood product sample, a first dilution comprising one part of the high concentration sample and one part of the low concentration sample, a second dilution comprising one part the first dilution and one part the low concentration sample, and a third dilution comprising one part the first dilution and one part the high concentration sample; and preparing a slide for each of the plurality of equidistant dilutions by processing each of the equidistant dilutions for the first blood or blood product component in an image-based hematology analyzer to print, fix and stain the equidistant dilution onto a slide.

In some embodiments, the high concentration blood sample and the low concentration blood sample originate from the same blood sample. In certain embodiments, the high concentration blood sample and low concentration blood sample each includes a predetermined concentration of the first component.

In some embodiments, the first blood component is selected from a group consisting of red blood cells (RBC), white blood cells (WBC), platelets (PLT), reticulocytes (RET), and nucleated red blood cells (NRBC).

In certain embodiments, the methods further include conducting each of the recited steps for a second blood component to produce a second set of linearity control slides for the second blood component.

In some embodiments, the second blood component is selected from a group consisting of RBC, WBC, PLT, RET, and NRBC. In certain embodiments, the first blood component is RBCs. In some embodiments, the high concentration blood sample is ≥8.0×10⁶/µL of RBCs and the low concentration blood sample is ≤0.4×10⁶/µL of RBCs.

In some embodiments, the first blood component is WBCs. In some embodiments, the high concentration blood sample is ≥400×10³/µL of WBCs and the low concentration blood sample is ≤0.1×10³/µL of WBCs. In some embodiments, the low concentration blood sample of WBCs further comprises greater than 1.5×10⁶/µL RBCs.

In certain embodiments, the first blood component is PLTs. In some embodiments, the high concentration blood sample is ≥5000×10³/µL of PLTs and the low concentration blood sample is less than or equal to ≤10×10³/µL of PLTs. In some embodiments, the low concentration blood sample of PLTs further comprises greater than 1.5×10⁶/µL RBCs.

In some embodiments, the plurality of equidistant dilutions are each processed on two, three, four, five, or six slides.

In some embodiments, the plurality of equidistant dilutions further comprises a fourth dilution comprising one part of the low concentration blood sample and one part of the second dilution, a fifth dilution comprising one part of the second dilution and one part the first dilution, a sixth dilution comprising one part of the first dilution and one part of the third dilution, and a seventh dilution comprising one part of the high concentration blood sample and one part of the third dilution.

As used herein, the recited terms have the following meanings. All other terms and phrases used in the specification have their ordinary meaning as one skilled in the art would understand.

References herein to "linearity" indicate the ability, within a given concentration range, to provide results that are directly proportional to the concentration of specific cellular or blood components, for example, RBC, WBC, PLT, and RET in a single sample. The linearity of a system (e.g., image-based hematology system) is measured by testing a range of concentrations of each cellular component in a sample, which are of known amounts, and when the hematology system results are plotted against these known values, the degree to which the results conform to a straight line is a measure of the system's linearity.

References herein to "linearity control slides" refer to a series of slides that are comprised of samples containing varying known amounts of cellular or blood components that are printed, fixed, and stained on slides that can subsequently be used to determine or verify the linear range of image-based hematology analyzers.

References herein to "analytical measuring interval" ("AMI") or "reportable range" refer to the range of analyte values that a method can directly measure on a given specimen without any dilution, concentration, or other pretreatment not part of normal sample processing.

References herein to "equidistant dilutions" or "equidistant concentrations" refer to equally spaced intermediate concentration levels between high and low concentration samples of specific blood components.

References herein to "zero bias" or "zero percent deviation from linearity" refer to when there is no difference between the predetermined (known) concentration values of the specific blood components and the results of the linearity assay as returned by the system under test.

Whole blood (implementation) protocols may also be used to prepare samples to verify linearity on image-based hematology analyzers. However, such whole blood protocols are time-consuming, costly, and are highly sample-dependent resulting in a limited (truncated) reportable range.

The linearity control slides disclosed herein can be premanufactured for an end-user, thus eliminating the need for technical expertise at the customer site and resulting in time and cost savings as well as a larger reportable range than using whole blood linearity samples or protocols.

The new linearity control compositions and methods provide various benefits and advantages. For example, for AMI claims or levels, there are no commercially available linearity kits suitable to demonstrate linearity claims or levels on an imaged-based hematology analyzer, such as the Roche Cobas® m 511 system. The whole blood implementation protocols do not meet specifications published in the manufacturer's SAPC (System Analytical Performance Characteristics) document. The AMI ranges listed in Table 2 cannot be achieved for WBC and PLT using whole blood implementation protocols, because the samples required to achieve the AMI ranges are not readily available, are challenging to resource from a third-party provider, are expensive, and require significant technical expertise to manipulate to create a linearity series successfully. The slide-based solution, however, allows for the opportunity to secure highly specialized samples which can be subsequently manipulated by a minimum number of trained specialists who will create samples and slides (linearity control slides) that meet AMI requirements and are suitable for re-imaging on additional Cobas® m 511 systems. This slide-based linearity solution will allow the entire AMI, as claimed by the manufacturer, to be validated at customer sites.

With respect to reliability, the new compositions and methods improve upon using slide-based solutions, because early detection of optical variances between systems will be identified. Generating AMI slides eliminates "carry-over" of residual particles, which is a common occurrence using liquid-based hematology analyzers. With a qualified set of AMI slides generated from well-maintained and monitored Cobas® m 511 systems, the process of re-imaging the AMI slides could detect failures in optical systems in the field. If a newly tested Cobas® m 511 system does not compare well analytically to a "golden" Cobas® m 511 system, a failure would provide grounds to initiate a service investigation. Therefore, early detection of optical issues could be identified with the slide-based solution.

The new compositions and methods also reduce costs, because the initial costs incurred by executing current linearity verification protocols (described in Examples 1-3) can be divided by how many times the manufactured slides are re-imaged on other Cobas® m 511 test systems. Additionally, multiple sets of linearity series slides can be generated from the same verification experiment or raw material (e.g., 10 sets of slides). Each of these slides can then be distributed and used for slide-based linearity validation until expiration. For example, at a cost of $5,000 US/10 sets/50 instrument validations=$10 US per set. Therefore, cost can be significantly reduced by utilizing the slide-based solution.

The time to execute whole blood linearity protocols at a single customer site can take approximately five days. On the other hand, linearity validation using the slide-based solution described herein can be performed in a one day, thus saving a significant amount of time.

The linearity control slides can be used for applications including, but not limited to, linearity validation, quality control, proficiency testing, and optical analytics of image-based hematology analyzers. The linearity control slides are advantageous because they are reliable, robust, stable for at least six months, and can be used repeatedly on one or more image-based hematology systems.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following the detailed description, and from the claims.

DETAILED DESCRIPTION

Figure 1:
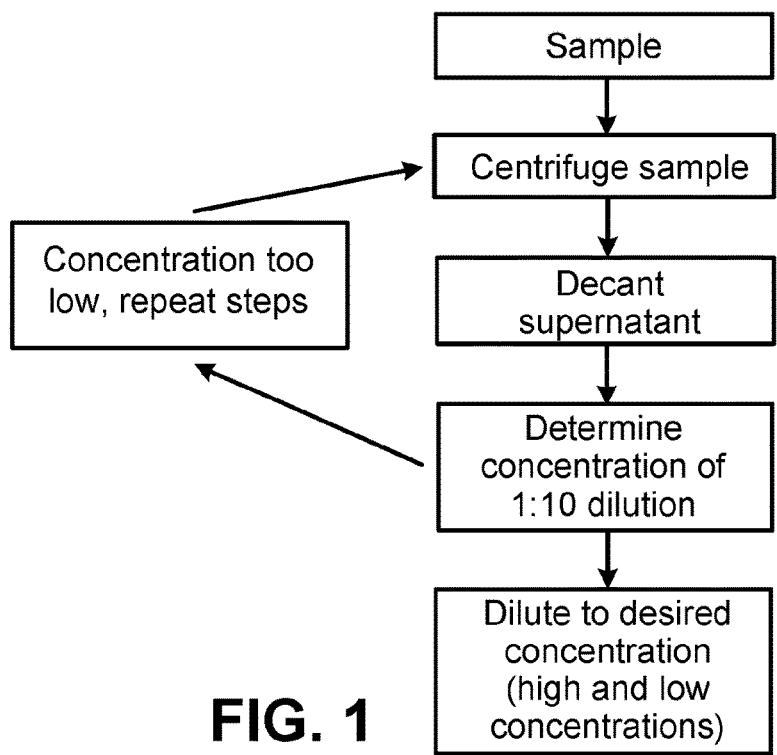
FIG. 1 is a high-level flowchart of the general method to prepare an initial high concentration blood sample and subsequent dilution of the high concentration sample to achieve a low concentration sample.

Verification of reportable ranges by linearity testing is often required for one or more measured parameters on image-based hematology analyzers, for example, such as those disclosed in U.S. Pat. Nos. 9,217,695; 10,094,764; and 10,764,538. To accomplish verification, the methods described herein can be used to prepare linearity control compositions and slides from specialized blood components and/or whole blood. The linearity control compositions include equidistant dilutions of blood components such as WBCs, RBCs, reticulocytes, PLTs, and RETs that are printed, fixed, and stained on a stabilized surface, e.g., a glass or plastic slide, e.g., a microscope slide, followed by digital image-based scanning to determine counts and concentrations for WBC, RBC (including HGB and HCT), PLT and RET.

A quantitative analytical method is said to be "linear" when measured results from a series of test samples are directly proportional to the known concentration of cellular or blood components in each of the test samples. Thus, a straight line can be used to characterize the relationship between measured test sample results and the known concentrations of the test samples for a predetermined range of concentrations resulting in the AMI or reportable range.

Before the development of the new methods and compositions described herein, verification protocols with specialized blood products were collected from donors each time the linearity verification protocol is to be executed. There was no commercially available linearity material specific for image-based hematology analyzers. The standard method for a verification protocol was to prepare slides of nine concentrations of a sample. Deviation from linearity was determined from the slides but was highly dependent on sample material and user experience. The slides were discarded once the verification protocol was verified.

Preparing linearity control compositions and slides using only whole blood does not provide results or measurements that span the manufacturer's linearity claims compared to linearity control compositions and slides prepared from specialized blood products and components as disclosed herein. Furthermore, performance of whole blood procedures requires a trained phlebotomist to draw patient or donor blood at the site where the image-based hematology analyzer is installed. The whole blood linearity range is also limited by available samples (patient population or donors) specific to the installation site. In addition, specialized onsite laboratory equipment and a trained technologist with proven technical competency are required to execute whole blood protocols. Successful linearity test outcomes are highly dependent on technical expertise (see FIG. 5B, a technical expertise-based linearity failure, rather than instrument failure). The whole blood linearity range that may be achieved, therefore, is greatly reduced or truncated compared to the manufacture's claims for linearity on image-based hematology analyzers due to a limited patient sample population, lack of specialized laboratory equipment, and lack of technical expertise and competency in creating the linearity series.

In contrast, linearity control slides prepared by the manufacturer from specialized blood products to create high, low, and intermediate concentration samples as described herein are cost-effective, efficient, and fulfill the manufacture's claims for linearity. The linearity control slides provide reproducible results, are stable up to 6 months, and can be used repeatedly on one or several image-based hematology systems.

General Methodology

The methods described herein provide for linearity control compositions, i.e., linearity control slides, which can be used to verify the reportable range of an image-based hematology analyzer. High and low concentration samples are prepared to specific concentrations for the specific blood component being tested. Equidistant intermediate dilutions are then prepared from the high and low concentration samples representing the AMI of the blood components. All samples are printed, fixed, and stained on slides to generate the linearity control slides, typically with multiple replicates, e.g., 6, 7, 8, or more replicates. The linearity slides can be used repeatedly on different image-based hematology analyzers resulting in reproducible linear range results for verifying the linearity.

Methods of Sample Preparation for Linearity Control Slides

Blood samples and specialized blood products are prepared to determine and/or verify linearity of the image-based hematology system for each blood component, e.g., WBC, RBC, PLT, and RET, and for calculated parameters, e.g., HGB, and HCT.

High concentration blood samples and low concentration blood samples are prepared generally as shown in FIG. 1. The blood sample or blood product is obtained from a healthy donor and centrifuged. For example, leukapheresis samples are obtained for WBC analysis, whole blood samples are obtained for RBC, HGB, and HCT analysis, and a platelet apheresis sample is obtained for PLT analysis. The resulting supernatant is removed and kept for later dilutions when necessary. The result of the "high concentration" linearity sample is determined by analyzing an aliquot on any other hematology analyzer. Final dilutions are made to meet the target value for the high and low concentration samples. RBC's may be added to the low concentration linearity samples, when an image-based hematology analyzer requires a minimum number of red blood cells for imaging.

In some embodiments, if the result of the high concentration linearity sample is less than the target value, the sample can be further processed using the steps described above. Table 1 shows the target values for the low concentration linearity samples and the high concentration linearity samples for RBC, WBC, and PLT parameters.

TABLE 1

Target Values for Low and High Concentration Control Linearity Slides for Parameters: WBC, PLT, and RBC (*Required for Imaging)

| Parameter | Low Concentration Linearity Samples | High Concentration Linearity Samples |
|---|---|---|
| WBC | ≤0.1 × 10³/µL >1.5 × 10⁶/µL RBC* | ≥400 × 10³/µL |
| PLT | ≤10 × 10³/µL >1.5 × 10⁶/µL RBC* | ≥5000 × 10³/µL |
| RBC | ≤0.4 × 10⁶/µL | ≥8.0 × 10⁶/µL |

Figure 2:
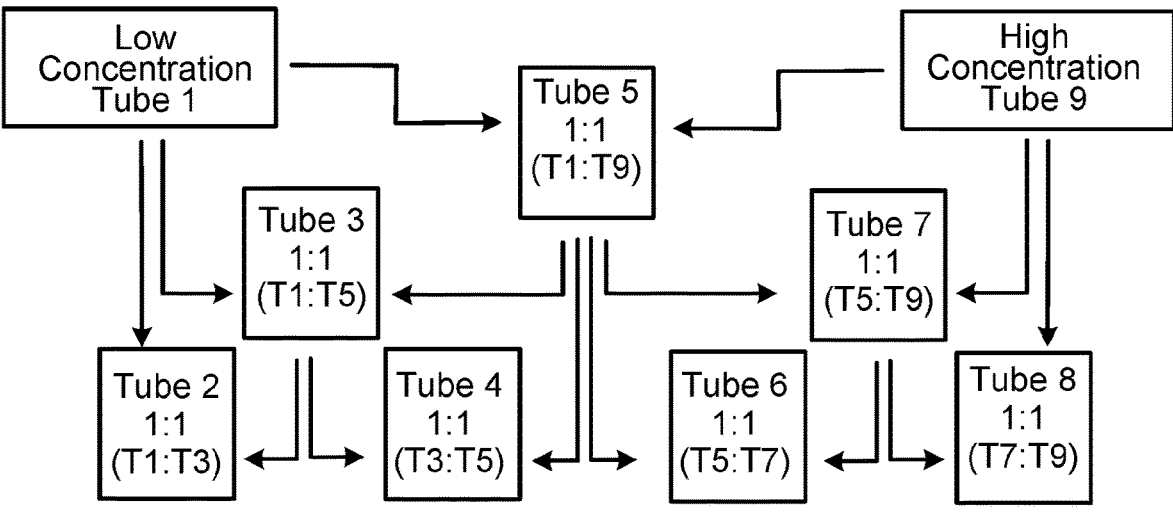
FIG. 2 is a flowchart of a detailed method to prepare equidistant dilutions between the low concentration blood sample and high concentration blood sample.

The high concentration and low concentration samples are used to prepare equidistant dilutions where there are three to seven intermediate dilutions between the high and low concentration samples resulting in five to nine total equidistant concentrations. FIG. 2 is a flowchart that shows the ratios of each tube used to prepare an equidistant dilution series between the high concentration sample (Tube 9) and the low concentration sample (Tube 1).

First, equal parts of the high and low concentration blood samples produce the middle intermediate concentration (Tube 5). Second, further dilutions between the low concentration and the middle concentration or the high concentration and the middle concentration result in intermediate concentrations (Tubes 3 and 7). Third, the intermediate concentrations can further be diluted with the middle concentration (Tubes 4 and 6), or with the high concentration (to produce Tube 8) or with the low concentration (to produce Tube 2). All dilutions are equal parts of the beginning concentrations.

Figure 3:
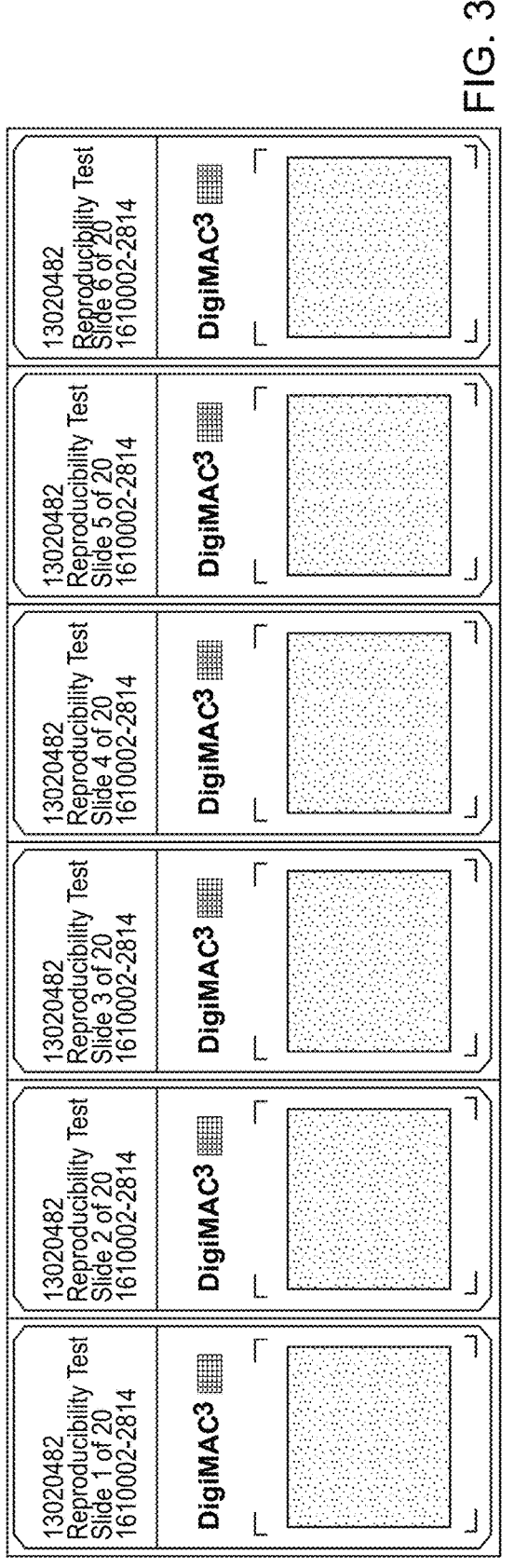
FIG. 3 is representation of a series of linearity samples that have been printed, fixed, and stained onto glass slides as processed by the image-based hematology analyzer, the Roche Cobas® m 511 system.

To prepare the new linearity control slides (shown in FIG. 3) in an automated manner, the equidistant concentrations are processed on an image-based hematology analyzer, e.g., the Roche Cobas® m 511 integrated hematology analyzer, using standard steps and methods to:

1) print each equidistant sample on one or more unique slides (replicates);
2) fix each unique slide with DigiMAC3™ fix solution;
3) stain each unique slide with DigiMAC3™ solution; and
4) rinse each slide with DigiMAC3™ rinse solution.

In further detail, each sample is printed in a monolayer on a slide, e.g., glass or plastic slide, (e.g., microscope slide), which are then fixed and stained. After staining, the sample slides are digitally imaged and the blood components are counted and compared to known values.

In some embodiments, the equidistant concentrations are processed either in open tube mode or closed tube mode (i.e., rack mode). Open tube mode refers to when the equidistant dilutions are processed using the open tube probe to aspirate the blood from the tube. Closed tube mode refers to when the equidistant dilutions are processed automatically by the image-based hematology analyzer automatically in closed tubes. For example, the equidistant dilutions can each be automatically retrieved from a tube rack and aspirated by the system using a sample probe that is designed or configured to pierce through a rubber stopper on each closed tube.

In some embodiments, the equidistant concentrations are processed onto multiple different slides to prepare replicates, e.g., two, three, four, five, six, or more replicates per concentration. In one example, each of the 9 prepared equidistant concentrations is printed, fixed, and stained on glass slides 6 times (6 replicates) generating a total of 54 linearity control slides for a specific blood component, e.g., RBC. The linearity control slides are analyzed on the image-based hematology analyzer and compared to the known lower and upper target values (range of AMI) as well as to the maximum allowable deviation from linearity as shown in Table 2. Results are analyzed according to the standards described in Clinical Laboratory Standards Institute: *H26-A2 Validation, Verification, and Quality Assurance of Automated Hematology Analyzers; Approved Standard—Second Edition*, June 2010 and EP06-A Evaluation of the Linearity of Quantitative Measurement Procedures; A Statistical Approach Approved Guideline—June 2003.

reporting analyzer and sample processing status; troubleshooting and error recover; quality control processing and results; reviewing sample results; classifying/reclassifying cells; and evaluating cell morphology.

Analyzer Software: The analyzer software runs the analyzer computer and manages all hardware elements, sample processing, data management, and viewing station communications.

Image Analysis Application: The image analysis application runs on the analyzer computer and communicates with the cameras and motion-control hardware to acquire images

TABLE 2

Acceptable Lower Limit and Upper Limit for WBC, PLT, RBC, HGB, and HCT and Maximum Allowable Deviation from Linearity (manufacturer's claims) using the specialized blood products as described in the Verification Protocols

| Parameter [Units] | Acceptable Lower Limit for Analytical Measuring Interval | Acceptable Upper Limit for Analytical Measuring Interval | Maximum Allowable Deviation from Linearity | |
|---|---|---|---|---|
| WBC [$10^3/\mu L$] | $\leq 0.1 \times 10^3/\mu L$ | $\geq 400 \times 10^3/\mu L$ | $\pm 0.50$ $10^3/\mu L$ | for WBC $<3.33 \times 10^3/\mu L$ |
| | | | 15% | for WBC $\geq 3.33 \times 10^3/\mu L$ |
| PLT [$10^3/\mu L$] | $\leq 10 \times 10^3/\mu L$ | $\geq 5,000 \times 10^3/\mu L$ | $\pm 20$ PLT $10^3/\mu L$ | for PLT $<133 \times 10^3/\mu L$ |
| | | | 15% | for PLT $\geq 133 \times 10^3/\mu L$ |
| RBC [$10^6/\mu L$] | $\leq 0.4 \times 10^6/\mu L$ | $\geq 8.00 \times 10^6/\mu L$ | $\pm 0.20$ $10^6/\mu L$ | for RBC $<2.00 \times 10^6/\mu L$ |
| | | | 10% | for RBC $\geq 2.00 \times 10^6/\mu L$ |
| HGB [g/dL] | $\leq 1.2$ g/dL | $\geq 24$ g/dL | $\pm 0.50$ g/dL | for HGB $<5$ g/dL |
| | | | 10% | for HGB $\geq 5$ g/dL |
| HCT [%] | $\leq 3.60\%$ | $\geq 72\%$ | 1% | for HCT $<10\%$ HCT |
| | | | 10% | for HCT $\geq 10\%$ HCT |

In some embodiments, the linearity control slides are stored without refrigeration at room temperature. Further, the linearity slides can be stored without refrigeration in the dark for up to six months.

Methods of Using the Linearity Control Slides

The linearity control slides, as described herein, are used to verify the reportable range on image-based hematology analyzers. The preserved glass slides from each linearity series is saved and can be re-used (re-imaged) on one or more additional Cobas® m 511 integrated hematology analyzers that have been temporarily re-configured to bypass printing and staining, thus allowing the Cobas® m 511 system to perform digital identification and counting of cells on the preserved glass slide. Recovered counts and concentrations of the blood component on each linearity control slide, obtained for example, on the Cobas® m 511 system, are compared to the known value on each respective linearity control slide. Linearity of the system is determined by the relationship of the recovered counts and concentrations and known values.

In some embodiments, the linearity control slides can be analyzed repeatedly on the same image-based hematology analyzer or on different image-based hematology analyzers.

Linearity control slides can be used to verify the reportable range on an image-based hematology analyzer when the system is newly installed, re-installed, after receiving maintenance, major repair, troubleshooting, or at any interval determined by the end-user.

Software Used in Cobas® m 511 System

The Cobas® m 511 system includes three major software components: viewing station software, analyzer software, and the image analysis application.

Viewing Station Software: The viewing station software provides the user interface to the Cobas® m 511 analyzer, including: managing system configuration and consumables;

at both the low- and high-magnification imaging stations. The program identifies and measures cells in the images, and it reports the cell counts and measurements to the analyzer software. It also saves images for display on the viewing station.

EXAMPLES

The invention is further described in the following examples, which do not limit the scope of the invention described in the claims.

The examples disclosed below describe methods of preparing high and low concentration samples, which are used to generate the intermediate equidistant dilutions. Each blood cell type has a different protocol to meet the linearity requirements of the hematology analyzer. The equidistant dilutions are used to prepare the linearity control slides. The linearity control slides can be used multiple times and provide reproducibly accurate readings.

Linearity Protocols Prepared from Specialized Blood Products

Example 1: White Blood Cell Analytical Measuring Interval

The purpose of Example 1 was to establish that the AMI for an image-based hematology analyzer for the parameter WBC meets the linearity requirements.

To study WBC AMI, a fresh leukapheresis sample and three corresponding whole blood samples were obtained from a single volunteer donor. Approximately 120-130 mL of the leukapheresis sample was collected in anticoagulant citrate dextrose solution A (ACD-A). Each of the three 10 mL whole blood samples were collected in K2-EDTA sample collection tubes. The samples were concentrated and diluted (as necessary) to create a high concentration sample, low concentration sample, and seven intermediate equidistant concentration samples resulting in a unique linearity series (as shown in FIG. 2). A total of three different linearity series were created to run on three Cobas® m 511 systems. Each concentration sample of the linearity series was processed for six replicates in both the closed tube and open tube modes.

High Concentration WBC Sample

The high concentration WBC sample was prepared to meet the WBC target concentration of $\geq 400 \times 10^3/\mu L$. The leukapheresis bag was mixed for approximately five minutes and the contents transferred to conical tubes, approximately 10 mL per tube. A baseline sample was retained, and processed on another SYSMEX® Hematology Analyzer to obtain the WBC concentration.

If the WBC baseline result was less than the target value of $\geq 400 \times 10^3/\mu L$, then the remaining leukapheresis sample was centrifuged for twelve minutes at 1,000 rpms creating a WBC pellet. The supernatant was removed, leaving approximately 2 mL in each tube. The WBC pellet and supernatant were re-suspended and combined. If platelet aggregates were present, then the sample was discarded and the protocol was repeated with a new leukapheresis sample. A 1:10 dilution in STE buffer (Sodium Chloride-Tris-EDTA, 1× Solution, pH 8.0) of the concentrated sample was processed on another SYSMEX® Hematology Analyzer and the WBC concentration was obtained.

If the concentrated sample was less than the target value of $\geq 400 \times 10^3/\mu L$, the sample was re-centrifuged and additional supernatant was removed. The sample was again resuspended in STE buffer and a 1:10 dilution was analyzed on another SYSMEX® Hematology Analyzer for the WBC concentration. When the target value was met, the sample was labeled as the "high concentration" sample.

Low Concentration WBC Sample

The low concentration WBC sample was prepared to meet two target values, $\leq 0.1 \times 10^3/\mu L$ for WBC and $\geq 1.5 \times 10^6/\mu L$ for RBC. RBCs were added to meet the minimum number of cells necessary for the Roche image-based hematology analyzer (Cobas® m 511 system) to initiate sample processing and facilitate imaging. The three whole blood donor samples were centrifuged for twelve minutes at 4,000 rpms. The buffy coat layer was removed and the remaining contents were transferred to one tube. The sample was mixed and processed on another SYSMEX® Hematology Analyzer to obtain a WBC and a RBC result.

If the low concentration WBC target value for the sample was not met, then an equal volume of STE buffer was added and the sample was centrifuged for twelve minutes at 4,000 rpms. An additional buffy coat layer was removed and the sample was resuspended and analyzed on another SYSMEX® Hematology Analyzer. When the WBC and RBC target values were met, the sample was labeled as the "low concentration" sample.

Linearity Series Preparation

An equidistant dilution series between the high concentration sample and the low concentration sample was prepared to create the linearity series (see FIG. 2). Tubes 1 through 9 were labeled, where Tube 1 contained the low concentration sample and Tube 9 contained the high concentration sample.

Tube 5 was prepared combining one part from Tube 1 and one part from Tube 9. Tube 3 was prepared combining one part from Tube 1 and one part from Tube 5. Tube 7 was prepared combining one part from Tube 5 and one part from Tube 9. Tube 2 was prepared combining one part from Tube 1 and one part from Tube 3. Tube 8 was prepared combining one part from Tube 7 and one part from Tube 9. Tube 4 was prepared combining one part from Tube 3 and one part from Tube 5. Tube 6 was prepared combining one part from Tube 5 and one part from Tube 7.

Sample Processing

Each dilution (concentration) was thoroughly mixed to prepare for processing by the Cobas® m 511 system using standard steps. Each sample was printed on a glass microscope slide in a monolayer and then automatically fixed and stained by the analyzer. The analyzer then automatically performed digital identification and counting of WBCs. Automated results for each dilution were compared to target values of each dilution to determine linearity of the samples.

Results for WBC Linearity Samples

Figure 4A:
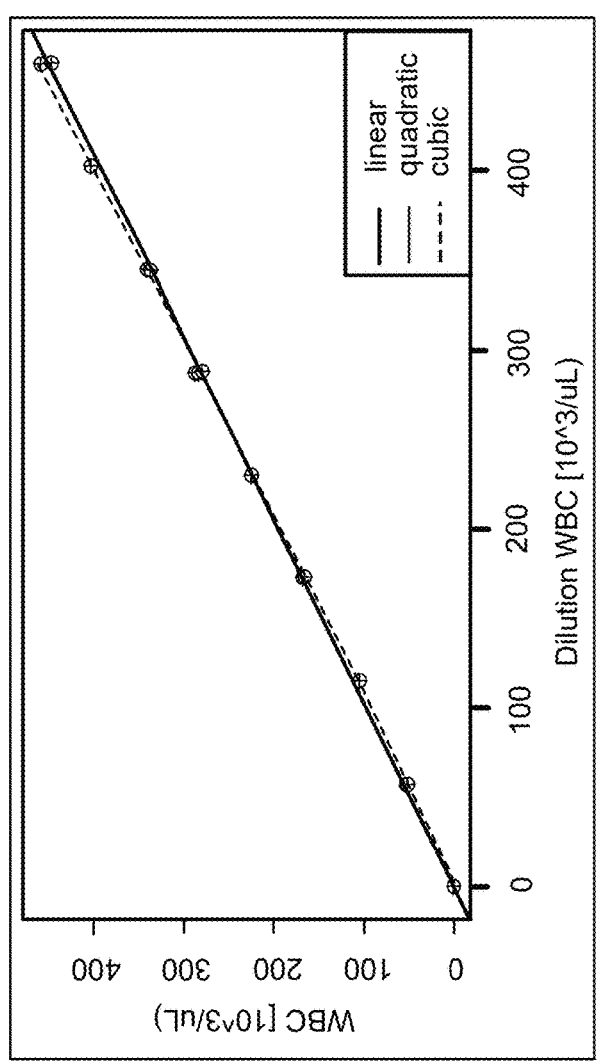
FIG. 4A is a representative graph of WBC analytical measuring interval (linearity) measured by the Cobas® m 511 system using high, low, and intermediate concentration blood samples or products prepared using a standard verification protocol as described herein.
Figure 4B:
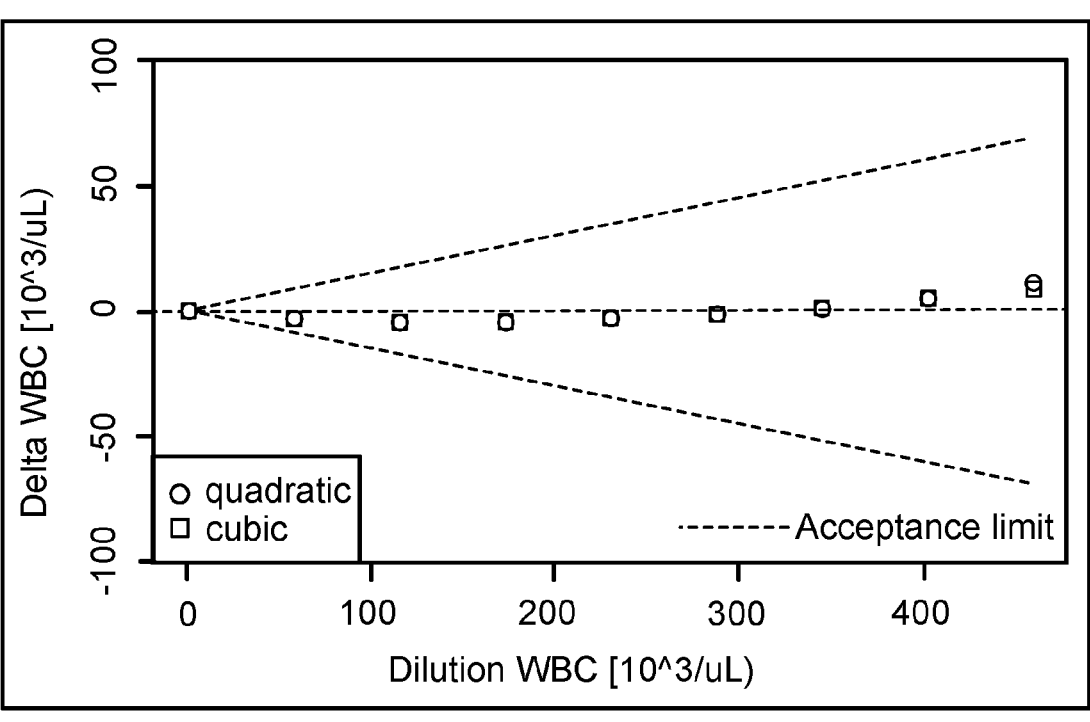
FIG. 4B is a representative graph of acceptable linearity limits and WBC deviation from linearity calculated from the analytical measuring interval of FIG. 4A.

Fifty-four WBC linearity slides (nine concentrations, six replicates per concentration), were processed on separate Cobas® m 511 systems and showed reproducible results. The nine equidistant data points spanning the complete WBC linear range ($\leq 0.1\text{-}400.0 \times 10^3/\mu L$) are shown in circles (FIG. 4A). The mean value of six replicates for each of the nine equidistant samples fell within acceptable limits as shown in the deviation from linearity graph (FIG. 4B).

TABLE 3

Deviation from Linearity for WBC Linearity Slides in FIG. 4A

| Target [$10^3/\mu L$] | Deviation.from. Linearity [$10^3/\mu L$] | Deviation [%] | Criteria | | Pass/Fail |
|---|---|---|---|---|---|
| 6e−02 | 3.8e−03 | 6.3 | 0.5 | [$10^3/\mu L$] | OK |
| 57.62 | −2.88 | −5.0 | 15 | [%] | OK |
| 115.17 | −4.24 | −3.7 | 15 | [%] | OK |
| 172.72 | −4.24 | −2.5 | 15 | [%] | OK |
| 230.28 | −3.1 | −1.3 | 15 | [%] | OK |
| 287.83 | −0.99 | −0.3 | 15 | [%] | OK |
| 345.39 | 1.9 | 0.6 | 15 | [%] | OK |
| 402.94 | 5.38 | 1.3 | 15 | [%] | OK |
| 460.5 | 9.25 | 2.0 | 15 | [%] | OK |

TABLE 4

Deviation from Linearity for WBC Linearity Slides Analyzed on Separate cobas ® m 511 System

| Target [$10^3/\mu L$] | Deviation.from. Linearity [$10^3/\mu L$] | Deviation [%] | Criteria | | Pass/Fail |
|---|---|---|---|---|---|
| 4e−02 | 6.3e−03 | 15.8 | 0.5 | [$10^3/\mu L$] | OK |
| 70.17 | −7.91 | −11.3 | 15 | [%] | OK |
| 140.31 | −8.47 | −6.0 | 15 | [%] | OK |
| 210.44 | −4.34 | −2.1 | 15 | [%] | OK |
| 280.57 | 1.85 | 0.7 | 15 | [%] | OK |
| 350.7 | 7.44 | 2.1 | 15 | [%] | OK |
| 420.83 | 9.77 | 2.3 | 15 | [%] | OK |
| 490.97 | 6.2 | 1.3 | 15 | [%] | OK |
| 561.1 | −5.92 | −1.1 | 15 | [%] | OK |

Tables 3 and 4 illustrate the deviation from linearity for WBC linearity slides that were processed and analyzed on separate Cobas® m 511 systems. Preparation of the blood samples and slides was as described above. Deviation from linearity was within acceptable limits for both sets of slides and systems that were used.

Example 2: Red Blood Cell, Hemoglobin, and Hematocrit Analytical Measuring Interval The purpose of Example 2 was to establish that the AMI for an image-based hematology analyzer for combined parameters RBC-HGB-HCT meet the linearity requirements.

To study RBC-HGB-HCT AMI, ten-10 mL whole blood samples, collected in K2-EDTA tubes, were obtained from a single volunteer donor. One of the ten tubes was processed on another SYSMEX® Hematology Analyzer to obtain the complete blood count (CBC). The samples were concentrated and diluted (as necessary) to create a high concentration sample, low concentration sample, and seven intermediate equidistant concentration samples resulting in a unique linearity series (as shown in FIG. 2). The linearity series was processed on three separate Cobas® m 511 systems. Each concentration sample of the linearity series was processed for six replicates in both the closed tube and open tube modes.

High and Low Concentration RBC Sample

The high concentration blood sample was prepared to meet the target concentration of RBC≥8.00×10⁶/μL. One of the 10 mL K2-EDTA donor sample tubes was labeled as "baseline" and processed on another SYSMEX® Hematology Analyzer to obtain a baseline CBC result. This tube was then set aside for later use. The remaining nine donor sample tubes were centrifuged for ten minutes at 4,000 rpm. During this centrifugation step, two 50 mL conical tubes were obtained and labeled as "plasma" and "packed RBC's" respectively.

After centrifugation was complete, the plasma from each of the nine (9) donor sample tubes was transferred into a 50 mL conical tube labeled "plasma." Then the packed RBCs were transferred into a fresh 50 mL conical tube labeled "packed RBC's" and thoroughly mixed. A 500 μL aliquot of "packed RBCs" was transferred into a red/grey-top tube. Into this same red/grey-top tube a 500 μL aliquot from the "plasma" tube was added, thus creating a 1:1 dilution. The 1:1 dilution tube was processed on another SYSMEX® Hematology Analyzer to obtain RBC, HGB, and HCT results. If the RBC result met the target value of ≥8.00×10⁶/μL, the tube was labeled as "high concentration" sample.

The low concentration blood sample was prepared by diluting the donor sample previously set aside, to meet the target concentration of ≤0.40×10⁶/μL. When the target value was met, the sample was labeled as the "low concentration" sample.

Linearity Series Preparation

Equidistant dilutions were prepared using the high and low concentration samples as described in Example 1 and as shown in FIG. 2. Nine dilutions were processed for six replicates on the Cobas® m 511 system.

Sample Processing

Each dilution (concentration) was thoroughly mixed to prepare for processing by the Cobas® m 511 system. Each sample was printed on a glass microscope slide in a monolayer, and then automatically fixed and stained by the analyzer. The analyzer then automatically performed digital identification and counting of RBCs and evaluated RBCs— for cellular morphology and content (e.g., HGB and HCT). Automated results for each dilution were compared to target values of each dilution to determine linearity of the samples.

Results for RBC Linearity Samples

Fifty-four RBC linearity slides (nine concentrations, six replicates per concentration), were processed on three separate Cobas® m 511 systems and showed reproducible results. Nine equidistant data points spanned the linear ranges:

≤0.4-≥8.00×10⁶/μL for RBC,
≤1.2-≥24.0 g/dL for HGB, and
≤3.6-≥72.0% for HCT.

TABLE 5

Deviation from Linearity for RBC Linearity Slides

| Target [10⁶/μL] | Deviation.from. Linearity [10⁶/μL] | Deviation [%] | Criteria | Pass/Fail |
|---|---|---|---|---|
| 0.37 | 2.6e−02 | 7.2 | 0.2 [10⁶/μL] | OK |
| 1.36 | −2.8e−02 | −2.1 | 0.2 [10⁶/μL] | OK |
| 2.34 | −3.5e−02 | −1.5 | 10 [%] | OK |
| 3.33 | −1.1e−02 | −0.3 | 10 [%] | OK |
| 4.32 | 2.9e−02 | 0.7 | 10 [%] | OK |
| 5.3 | 6.9e−02 | 1.3 | 10 [%] | OK |
| 6.29 | 9.2e−02 | 1.5 | 10 [%] | OK |
| 7.27 | 8.3e−02 | 1.1 | 10 [%] | OK |
| 8.26 | 2.6e−02 | 0.3 | 10 [%] | OK |

TABLE 6

Deviation from Linearity for HGB Linearity Slides

| Target [g/dL] | Deviation.from. Linearity [g/dL] | Deviation [%] | Criteria | Pass/Fail |
|---|---|---|---|---|
| 1.1 | 0.11 | 9.7 | 0.5 [g/dL] | OK |
| 3.99 | −1.8e−02 | −0.5 | 0.5 [g/dL] | OK |
| 6.88 | −7.8e−02 | −1.1 | 10 [%] | OK |
| 9.76 | −8.4e−02 | −0.9 | 10 [%] | OK |
| 12.65 | −5.0e−02 | −0.4 | 10 [%] | OK |
| 15.54 | 1.3e−02 | 0.1 | 10 [%] | OK |
| 18.43 | 9.1e−02 | 0.5 | 10 [%] | OK |
| 21.31 | 0.17 | 0.8 | 10 [%] | OK |
| 24.2 | 0.25 | 1.0 | 10 [%] | OK |

TABLE 7

Deviation from Linearity for HCT Linearity Slides

| Target | Deviation.from. Linearity | Deviation [%] | Criteria | Pass/Fail |
|---|---|---|---|---|
| 3.2 | 5.6e−02 | 1.8 | 1 | OK |
| 11.82 | −0.29 | −2.4 | 10 [%] | OK |
| 20.45 | −0.34 | −1.7 | 10 [%] | OK |
| 29.07 | −0.19 | −0.7 | 10 [%] | OK |
| 37.7 | 5.3e−02 | 0.1 | 10 [%] | OK |
| 46.33 | 0.31 | 0.7 | 10 [%] | OK |
| 54.95 | 0.48 | 0.9 | 10 [%] | OK |
| 63.58 | 0.46 | 0.7 | 10 [%] | OK |
| 72.2 | 0.17 | 0.2 | 10 [%] | OK |

Slides were preparation as described above. Slides were measured on a Cobas® m 511 system for RBC, HGB, and HCT, using standard steps. The mean value of six replicates for each of the nine equidistant samples fell within acceptable limits for deviation from linearity for RBC (Table 5), HGB (Table 6), and HCT (Table 7).

Example 3: Platelet Analytical Measuring Interval

The purpose of Example 3 was to establish that the AMI for an image-based hematology analyzer for the parameter PLT meets the linearity requirements.

To study PLT AMI, a single-unit PLT apheresis sample was obtained from a single donor. Each single-unit of this component donor contained a minimum of 150 mL to a maximum of 400 mL product collected in ACD-A anticoagulant. Also required was 80-100 mL pooled ABO/Rh compatible whole blood that was inspected to ensure that clots and aggregates were not present. The samples were concentrated and diluted (as necessary) to create a high concentration sample, low concentration sample, and seven intermediate equidistant concentration samples resulting in a unique linearity series (as shown in FIG. 2). The linearity series was processed on three separate Cobas® m 511 systems. Each concentration sample of the linearity series was processed for six replicates in both the closed tube and open tube modes.

High and Low Concentration PLT Sample

The high concentration sample was prepared to meet the target value of ≥5,000×$10^3$/μL for PLT. A conical tube with 4 mL STE buffer was prepared with 100 mg/mL $K_2$-EDTA. The PLT apheresis sample was transferred into the conical tube and mixed with RBCs and buffer solutions. The conical tube was centrifuged for twelve minutes at 4,000 rpm. The supernatant was removed, the PLT pellet was re-suspended, and a dilution of the remaining solution for PLT and RBCs was analyzed on a SYSMEX® Hematology Analyzer to obtain results for the PLTs in the sample.

The low concentration blood sample was prepared to meet the target value of ≤10×$10^3$/μL for PLT and ≥1.5×$10^6$/μL for RBC. All ABO/Rh compatible whole blood samples were centrifuged for twelve minutes at 4,000 rpm. The buffy coat layer was removed. The remaining RBCs were then washed using STE buffer. The sample was then tested on a SYSMEX® Hematology Analyzer to assign target values for PLT and RBC.

Linearity Series Preparation

Equidistant dilutions were prepared using the high and low concentration samples as described in Example 1 and as shown in FIG. 2. Nine dilutions were processed for six replicates on an image-based hematology analyzer. Results for PLT were obtained for each linearity series.

Sample Processing

Each dilution (concentration) was thoroughly mixed to prepare for processing by the Cobas® m 511 system. Each sample was printed on a glass microscope slide in a monolayer, and then automatically fixed and stained by the analyzer. The analyzer then automatically performed digital identification and counting of PLTs. Automated results for each dilution were compared to target values of each dilution to determine linearity of the samples.

Results for PLT Linearity Samples

Fifty-four PLT linearity slides (nine concentrations, six replicates per concentration), were processed on separate Cobas® m 511 systems using standard steps and showed reproducible results. Nine equidistant data points spanning the complete PLT linear range≤10×$10^3$/μL and ≥5,000×$10^3$/μL) were used.

TABLE 8

| | Deviation from Linearity for PLT Linearity Slides | | | |
|---|---|---|---|---|
| Target [$10^3$/μL] | Deviation.from. Linearity [$10^3$/μL] | Deviation [%] | Criteria | Pass/Fail |
| 5 | −6.9e−03 | −0.1 | 20 [$10^3$/μL] | OK |
| 631.88 | 12.57 | 2.0 | 15 [%] | OK |
| 1258.75 | 24.92 | 2.0 | 15 [%] | OK |
| 1885.62 | 31.68 | 1.7 | 15 [%] | OK |
| 2512.5 | 27.47 | 1.1 | 15 [%] | OK |

TABLE 8-continued

| | Deviation from Linearity for PLT Linearity Slides | | | |
|---|---|---|---|---|
| Target [$10^3$/μL] | Deviation.from. Linearity [$10^3$/μL] | Deviation [%] | Criteria | Pass/Fail |
| 3139.38 | 6.9 | 0.2 | 15 [%] | OK |
| 3766.25 | −35.39 | −0.9 | 15 [%] | OK |
| 4393.12 | −104.8 | −2.4 | 15 [%] | OK |
| 5020 | −206.7 | −4.1 | 15 [%] | OK |

The mean value of six replicates for each of the nine equidistant samples fell within acceptable limits as shown in the deviation from linearity graph (Table 8).

Linearity Protocols Prepared from Whole Blood

Table 9 shows the target values for the low concentration linearity samples and high concentration linearity samples for parameters WBC, PLT, and RBC/HGB using whole blood protocols.

TABLE 9

| | Target Values for Low and High Concentration Linearity Samples for Parameters: WBC, PLT, RBC and HGB using Whole Blood Samples and Protocols (*Required for Imaging) | |
|---|---|---|
| Parameter [Units] | Low Concentration Linearity Samples | High Concentration Linearity Samples |
| WBC [$10^3$/μL] | ≤0.7 × $10^3$/μL 1.5 – 0.3 × $10^6$/μL RBC* | ≥99 × $10^3$/μL |
| PLT [$10^3$/μL] | ≥0 × $10^3$/μL 1.5 – 0.3 × $10^6$/μL RBC* | ≥999 × $10^3$/μL |
| RBC [$10^6$/μL] | ≤0.3 × $10^6$/μL | ≥7.0 × $10^6$/μL |
| HGB [g/dL] | 2.0 g/dL | 24 g/dL |

The high concentration sample and the low concentration sample are used to prepare equidistant dilutions similar to as previously described, however, there are only three intermediate dilutions between the high and low concentration samples resulting in a total of five equidistant concentrations. Similar to the FIG. 2 flowchart, the high concentration blood sample (Tube 5) and the low concentration blood sample (Tube 1) are identified. Equal parts of the high and low concentration blood samples produce the middle intermediate concentration (Tube 3). Second, further dilutions between the low concentration and the middle concentration or the high concentration and the middle concentration result in intermediate concentrations (Tubes 2 and 4).

Each sample is printed in a monolayer on a slide, e.g., glass or plastic slide, (e.g., microscope slide) and are fixed and stained. After staining, the sample slides are automatically imaged and the blood components are counted and compared to known values.

In some embodiments, the equidistant concentrations are processed either in open tube mode or closed tube mode (i.e., rack mode). In the following examples, each of the 5 prepared equidistant concentrations was printed, fixed, and stained on glass slides 6 times (6 replicates) generating a total of 30 linearity measurements for each blood parameter. The linearity measurements were analyzed on the image-based hematology analyzer according to the standards described in Clinical Laboratory Standards Institute, *H26-A2 Validation, Verification, and Quality Assurance of Automated Hematology Analyzers; Approved Standard—Second Edition*, June 2010, and compared to the known lower and upper target values (truncated range of AMI) as well as to the maximum allowable deviation from linearity as shown in Tables 10 (China Food and Drug Administration (CFDA)) and 11 (United States Food and Drug Administration (USFDA)).

TABLE 10

Representative (CFDA/truncated) Acceptable Lower and Upper Limits for WBC, PLT, RBC, and HGB AMI and Maximum Allowable Deviation from Linearity Using Whole Blood Protocols

| Parameter [Units] | Acceptable Lower Limit for Analytical Measuring Interval | Acceptable Upper Limit for Analytical Measuring Interval | Maximum Allowable Deviation from Linearity | |
|---|---|---|---|---|
| WBC [$10^3$/µL] | $1.0 \times 10^3$/µL | $99 \times 10^3$/µL | $\pm 0.50 \ 10^3$/µL 5% | for WBC: $1.0 - 10 \times 10^3$/µL for WBC: $10.1 - 99.9 \times 10^3$/µL |
| PLT [$10^3$/µL] | $20 \times 10^3$/µL | $999 \times 10^3$/µL | $\pm 10$ PLT $10^3$/µL 10% | for PLT: $20 - 100 \times 10^3$/µL for PLT: $101 - 999 \times 10^3$/µL |
| RBC [$10^6$/µL] | $0.3 \times 10^6$/µL | $7.00 \times 10^6$/µL | $\pm 0.05 \ 10^6$/µL 5% | for RBC: $0.3 - 1.0 \times 10^6$/µL for RBC: $1.01 - 7.0 \times 10^6$/µL |
| HGB [g/dL] | 2.0 g/dL | 24 g/dL | $\pm 0.20$ g/dL 3% | for HGB: $2 - 7$ g/dL for HGB: $7.1 - 24.0$ g/dL |

TABLE 11

Representative (USFDA/truncated) Acceptable Lower and Upper Limits for WBC, PLT, RBC, and HGB AMI and Maximum Allowable Deviation from Linearity Using Whole Blood Protocols

| Parameter [Units] | Acceptable Lower Limit for Analytical Measuring Interval | Acceptable Upper Limit for Analytical Measuring Interval | Maximum Allowable Deviation from Linearity per CLIA Requirements |
|---|---|---|---|
| WBC [$10^3$/µL] | $\leq 0.07 \times 10^3$/µL | $\geq 99 \times 10^3$/µL | 15% |
| PLT [$10^3$/µL] | $\geq 0 \times 10^3$/µL | $\geq 999 \times 10^3$/µL | 25% |
| RBC [$10^6$/µL] | $0.3 \times 10^6$/µL | $7.00 \times 10^6$/µL | 6% |
| HGB [g/dL] | 2.0 g/dL | 24 g/dL | 7% |

Example 4: Comparison of WBC Linearity Using the Whole Blood Protocol

Without specialized samples and sample preparation, as described in Example 1, the entire AMI for WBC cannot be achieved. The purpose of Example 4 was to demonstrate the reduced (truncated) range of AMI for an image-based hematology analyzer when using samples prepared with a whole blood implementation protocol for WBC.

To study whole blood WBC AMI, a minimum of fifteen (15), 10 mL K2/K3-EDTA tubes from a single donor were obtained via standard venipuncture and mixed thoroughly. Using a wooden applicator stick, all tubes were inspected for clots. If any sample was clotted, it was discarded and recollected. The donor samples were concentrated and diluted (as necessary) to create high and low concentration linearity samples.

Baseline WBC Sample

One of the 15 tubes of donor blood was labeled "Baseline." The Baseline tube was processed on the Cobas® m 511 system using standard steps, and set aside for future use. It is recommended to collect a donor sample with a baseline WBC result of $\geq 8.0 \times 10^3$/µL.

High Concentration WBC Sample

The high concentration WBC sample was prepared to meet the WBC target value of $\geq 99 \times 10^3$/µL. To prepare the high concentration sample, the remaining donor tubes were centrifuged for ten (10) minutes at 5000 RPM. After centrifugation was complete, ~⅔ of the plasma was removed and transferred from each donor tube into a single 15 mL conical tube. This conical tube was labeled as "Plasma" and retain for later use. If disruption of the buffy-coat layer or RBC layer occurred, centrifugation steps were repeated.

After removing plasma, the buffy coat layer from each donor tube was removed and transferred into a single 15 mL conical tube. It is acceptable if some RBCs were pipetted from the buffy coat layer. This conical tube was labeled "high concentration" sample. The donor tubes (containing mostly RBCs) were retained for use in preparing the low concentration WBC sample.

The high concentration sample was vortexed for five (5) seconds and processed on the Cobas® m 511 system using standard steps. Result were reviewed to verify WBC was $>99.0 \times 10^3$/µL. If unable to achieve the high concentration WBC target value, a new donor sample with a baseline WBC result $>8.0 \times 10^3$/µL was collected.

Low Concentration WBC Sample

The low concentration WBC sample was prepared to meet two target values, $\leq 1.0 \times 10^3$/µL for WBC and $\geq 0.30 \times 10^6$/µL for RBC. RBCs were added to meet the minimum number of cells necessary for the Cobas® m 511 system to initiate sample processing and facilitate imaging.

To prepare the low concentration sample, an additional layer of RBCs (approximately 500 µL) was removed from three of the donor tubes retained as described above and transferred into a new 15 mL conical.

Plasma was transferred from the Plasma tube into the 15 mL conical tube containing the RBCs. This tube was labeled "low concentration." The low concentration sample was thoroughly mixed and processed on the Cobas® m 511 system using standard steps. Results were reviewed to verify that WBC was ≤1.0×10³/µL and RBC was ≥0.30×10⁶/µL target values were achieved.

Linearity Series Preparation

An equidistant linearity series was prepared between the high concentration sample and the low concentration sample. Tubes 1 through 5 were labeled, where Tube 1 contained the low concentration sample and Tube 5 contained the high concentration sample.

Tube 3 was prepared combining one part from Tube 1 and one part from Tube 5.

Tube 2 was prepared combining one part from Tube 1 and one part from Tube 3.

Tube 4 was prepared combining one part from Tube 3 and one part from Tube 5.

Sample Processing

Each tube of the linearity series was prepared for processing by a Cobas® m 511 system. Each sample was printed on a glass microscope slide in a monolayer, and then automatically fixed and stained by the analyzer. The analyzer also automatically performed digital identification and counting of WBCs. Automated WBC counts for each dilution were compared to target values of each dilution to determine linearity of the samples.

Results for WBC Linearity Samples

Figure 5A:
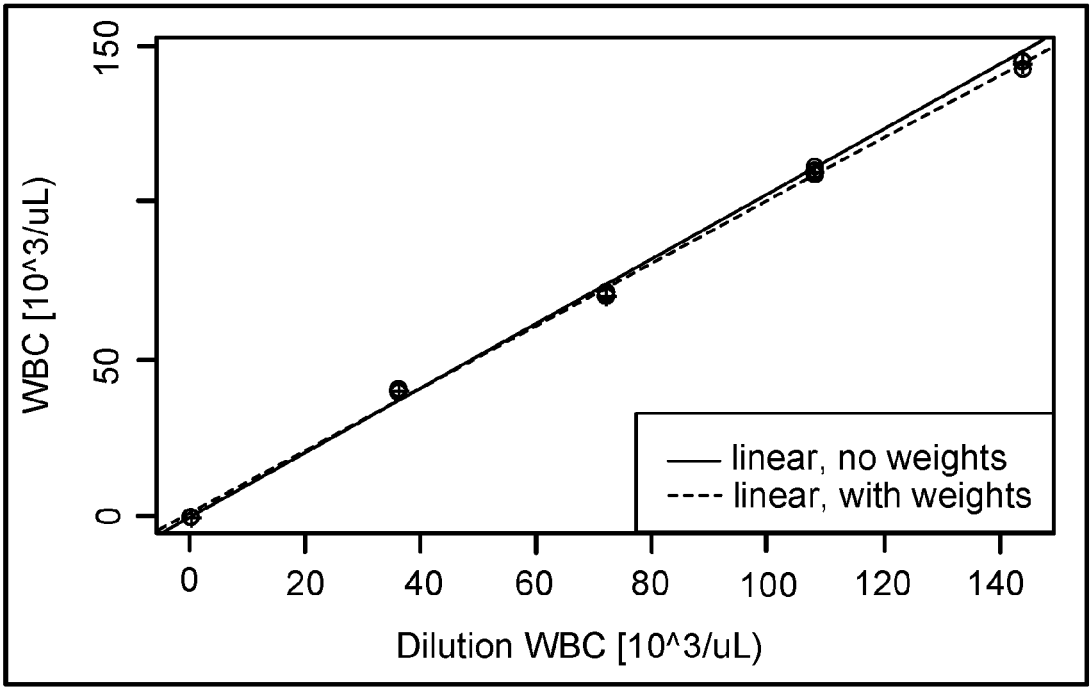
FIG. 5A is a representative graph of WBC analytical measuring interval (linearity) measured by the Cobas® m 511 system using high and low concentration blood samples prepared using a whole blood WBC protocol as described herein.
Figure 5B:
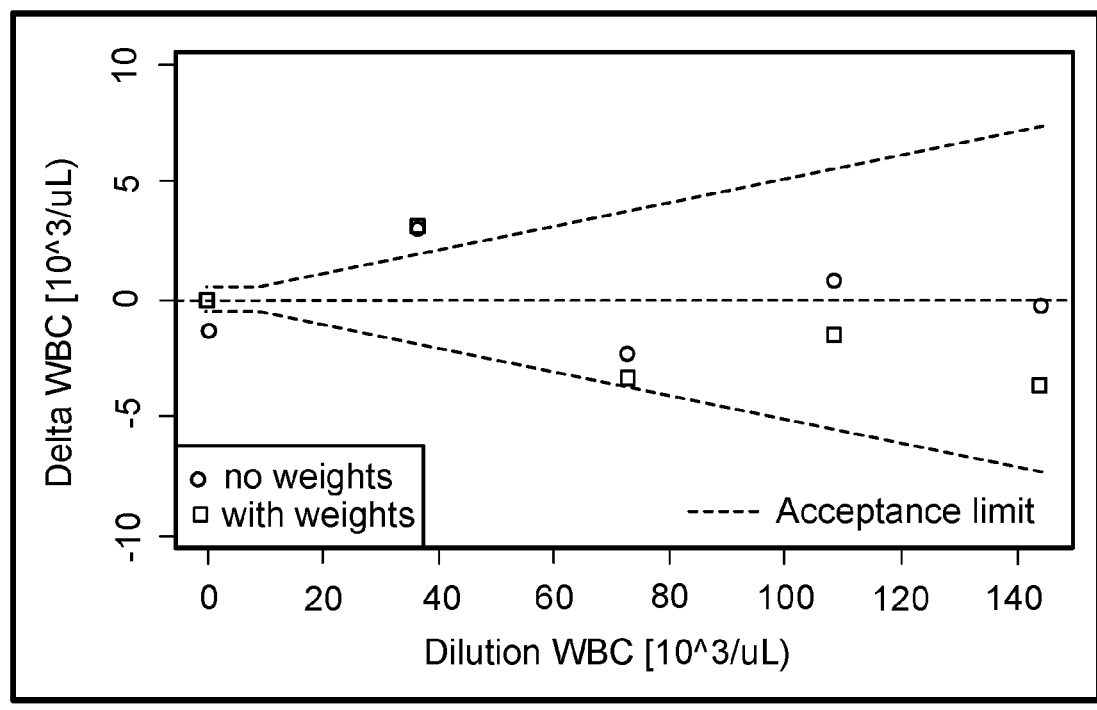
FIG. 5B is a representative graph of acceptable limits and WBC deviation from linearity calculated from the analytical measuring interval of FIG. 5A. Note the limited reportable range.

Thirty WBC linearity results (five concentrations, six replicates per concentration), were obtained on the Cobas® m 511 system. The five equidistant data points spanning a truncated WBC linear range (≤1.0-99.0×10³/µL) are shown in circles (FIG. 5A). The mean value of six replicates for each of the five equidistant samples did not fall within acceptable limits as shown in the deviation from linearity graph (FIG. 5B) due to poor operator technique.

TABLE 12

Deviation from Linearity for WBC Using
Whole Blood WBC Protocol in FIG. 5A

| Target [10³/µL] | N | Mean [10³/µL] | SD [10³/µL] | CV [%] | Var | Weight |
|---|---|---|---|---|---|---|
| 0.37 | 6.00 | 0.38 | 2.4e-02 | 6.3 | 5.9e-04 | 7.3 |
| 36.28 | 6.00 | 40.34 | 0.66 | 1.6 | 0.43 | 7.6e-04 |
| 72.19 | 6.00 | 70.76 | 0.77 | 1.1 | 0.59 | 1.9e-04 |
| 108.09 | 6.00 | 109.5 | 1.16 | 1.1 | 1.35 | 8.6e-05 |
| 144.00 | 6.00 | 144.1 | 1.30 | 0.9 | 1.70 | 4.8e-05 |

Comparison of FIGS. 4A and 4B to FIGS. 5A and 5B emphasizes the enhanced linear range of results, accuracy, and precision using specialized linearity samples versus a linearity series prepared from whole blood samples. Deviation from linearity for WBC using whole blood WBC protocol was higher than when using specialized blood products protocol (compare Tables 3 and 12).

Example 5: Comparison of RBC Linearity Using the Whole Blood Protocol

Without specialized samples and sample preparation, as described in Example 2, the entire AMI for RBC-HGB-HCT cannot be achieved. The purpose of Example 5 was to demonstrate the reduced (truncated) range of AMI for an image-based hematology analyzer when using samples prepared with a whole blood implementation protocol for RBC. Separate whole blood protocols can be developed for the analysis of HGB and HCT linearity.

To study whole blood RBC AMI, three (3), 10 mL K2/K3-EDTA tubes from a single donor were obtained via standard venipuncture and mixed thoroughly. Using a wooden applicator stick, all tubes were inspected for clots. If any sample was clotted, it was discarded and recollected. The donor samples were concentrated and diluted (as necessary) to create high and low concentration linearity samples.

Baseline RBC Sample

One of the 3 tubes of donor blood was labeled "Baseline." The Baseline tube was processed on the Cobas® m 511 system using standard steps and set aside for future use. It is recommended to collect a donor sample with a baseline RBC result of ≥4.5×10⁶/µL.

High Concentration RBC Sample

The high concentration RBC sample was prepared to meet the RBC target value of ≥7.0×10⁶/µL. To prepare the high concentration sample, the remaining donor tubes were centrifuged for ten (10) minutes at 5000 RPM. After centrifugation was complete, ~⅔ of the plasma was removed and transferred from each donor tube into a single 15 mL conical tube. This conical tube was labeled as "Plasma" and retained for later use. If disruption of the buffy-coat layer or RBC layer occurred, centrifugation steps were repeated.

Low Concentration RBC Sample

The low concentration RBC sample was prepared to meet a target value of ≤0.30×10⁶/µL. Aliquots of the Baseline and Plasma tubes previously set aside were combined and labeled "low concentration." The low concentration sample was thoroughly mixed and processed on the Cobas® m 511 system using standard steps. Results were reviewed to verify that RBC target value of ≤0.30×10⁶/µL was achieved.

Linearity Series Preparation

The linearity series was prepared by an equidistant dilution series between the high concentration sample and the low concentration sample as described in Example 4.

Sample Processing

Each dilution (concentration) was thoroughly mixed to prepare for processing by the Cobas® m 511 system. Each sample was printed on a glass microscope slide in a monolayer, and then automatically fixed and stained by the analyzer. The analyzer then automatically performed digital identification and counting of RBCs and evaluated RBCs—for cellular morphology and content (e.g. HGB and HCT). Automated results for each dilution were compared to target values of each dilution to determine linearity of the samples.

Results for RBC Linearity Samples

Thirty RBC linearity results (five concentrations, six replicates per concentration), were obtained on the Cobas® m 511 system. The five equidistant data points spanning a truncated RBC linear range (≤0.3-7.0×10⁶/µL). The mean value of six replicates for each of the five equidistant samples fell within acceptable limits as shown in Table 13.

TABLE 13

Deviation from Linearity for RBC Using Whole Blood RBC Protocol in FIG. 10A

| Target [$10^6$/µL] | Deviation.from. Linearity [$10^6$/µL] | Deviation [%] | Criteria | Pass/Fail |
|---|---|---|---|---|
| 0.27 | −9.0e−05 | −0.0 | 0.05 [$10^6$/µL] | OK |
| 2 | −6.8e−03 | −0.3 | 5 [%] | OK |
| 3.73 | 5.7e−02 | 1.5 | 5 [%] | OK |
| 5.46 | 5.2e−02 | 0.9 | 5 [%] | OK |
| 7.19 | −0.15 | −2.1 | 5 [%] | OK |

Comparison of Tables 5 and 13 emphasizes the enhanced linear range of results, accuracy, and precision using samples prepared from the high, low, and seven intermediate concentration samples versus a linearity series prepared from high, low, and three intermediate concentration samples. Deviation using whole blood RBC protocol was higher than when using specialized blood products protocol as described herein.

Example 6: Comparison of PLT Linearity Using the Whole Blood Protocol

Without specialized samples and sample preparation, described in Example 3, the entire AMI for PLT cannot be achieved. The purpose of Example 6 was to demonstrate the reduced (truncated) range of AMI for an image-based hematology analyzer when using samples prepared with a whole blood implementation protocol for PLT.

To study whole blood PLT AMI, a minimum of five (5), 10 mL K2/K3-EDTA tubes from a single donor were obtained via standard venipuncture and mixed thoroughly. Using a wooden applicator stick, all tubes were inspected for clots. If any sample was clotted, it was discarded and recollected. The donor samples were concentrated and diluted (as necessary) to create high and low concentration linearity samples.

Baseline PLT Sample

One of the 5 tubes of donor blood was labeled as "Baseline." The Baseline tube was processed on the Cobas® m 511 system using standard steps, and set aside for future use. It is recommended to collect a donor sample with a baseline PLT count of ≥300×$10^3$/µL.

Platelet Rich Plasma Sample Preparation

To create the high concentration PLT sample to meet the PLT target concentration of ≥999×$10^3$/µL, a Platelet Rich Plasma (PRP) fraction was first prepared by centrifuging the 4 remaining donor tubes for ten (10) minutes at 2000 RPM. While centrifugation occurred, 0.3 g of EDTA was weighed and transferred into each of two EDTA 15 mL conical tubes. After centrifugation was complete, the platelet rich plasma from each donor tube was removed and equally distributed between the two 15 mL conical tubes containing EDTA. It is acceptable if some RBCs were pipetted into the EDTA tubes during transfer of plasma due to unclear separation of RBCs and plasma layers. If separation of RBCs and plasma is not achieved based on a visual assessment, the donor tubes may be re-centrifuged for an additional five (5) minutes at 2000 RPM. The "PRP" tubes were mixed thoroughly to ensure the EDTA was dissolved into solution.

The following tubes were centrifuged for (10) minutes at 5000 RPM:

a. The two (2) 15 mL conical PRP tubes b. The two (2) 10 mL EDTA donor tubes with PRP removed High Concentration PLT Sample After centrifugation was completed and without disturbing the PLT pellet, the platelet poor plasma (PPP) was removed from the PRP tube and transferred into a new 15 mL conical tube labeled as "PPP" and retained for later use.

The contents of the two (2) "PRP" tubes were thoroughly mixed until no visible PLT pellet remained. The contents of the two "PRP" tubes were combined and 500 µL of "Baseline" sample was added. This conical tube was labeled as "high concentration."

The high concentration tube was mixed thoroughly and processed on the Cobas® m 511 system using standard steps. Results were reviewed to verify that PLT was >999× $10^3$/µL. If unable to achieve high concentration PLT requirement, a new donor sample with a higher baseline PLT result>300×$10^3$/µL was collected.

Low Concentration PLT Sample

The low concentration PLT sample was prepared to meet two target concentrations, ≤20.0×$10^3$/µL for PLT and >0.30× $10^6$/µL for RBC. RBCs were added to meet the minimum number of cells necessary for the Roche image-based hematology analyzer (Cobas® m 511 system) to initiate sample processing and facilitate imaging. To prepare the low concentration sample, the two (2) 10 mL EDTA donor tubes containing PRP were retrieved. Any remaining plasma and buffy coat was removed and discarded. The packed RBCs were transferred and combined into a new 15 mL conical tube labeled "low concentration into which 3.0-4.0 mL of PPP was transferred.

Contents of the low concentration tube were mixed thoroughly and processed on the Cobas® m 511 system using standard steps. Results were reviewed to verify that PLT was <20.0×$10^3$/µL and RBC was >0.30×$10^6$/µL.

Linearity Series Preparation

The linearity series was prepared by an equidistant dilution series between the high concentration sample and the low concentration sample as described in Example 4.

Sample Processing

Each dilution (concentration) was thoroughly mixed to prepare for processing by the Cobas® m 511 system. Each sample was printed on a glass microscope slide in a monolayer, and then automatically fixed and stained by the analyzer. The analyzer then automatically performed digital identification and counting of PLTs. Automated results for each dilution were compared to target values of each dilution to determine linearity of the samples.

Results for PLT Linearity Samples

Thirty PLT linearity results (five concentrations, six replicates per concentration), were obtained on the Cobas® m 511 system using standard steps. Five equidistant data points spanning the truncated PLT linear range (8-1379×$10^3$/µL) were used. The mean value of six replicates for each of the five equidistant samples fell within acceptable limits as shown in Table 14.

TABLE 14

| Deviation from Linearity for PLT Using Whole Blood PLT Protocol in FIG. 11A | | | | | | |
|---|---|---|---|---|---|---|
| Target [$10^3$/μL] | N | Mean [$10^3$/μL] | SD [$10^3$/μL] | CV [%] | Var | Weight |
| 8 | 6 | 8.17 | 0.41 | 5.0 | 0.17 | 1.6e–02 |
| 350.75 | 6 | 356 | 2.9 | 0.8 | 8.4 | 8.1e–06 |
| 693.5 | 6 | 692.5 | 13.49 | 1.9 | 181.9 | 2.1e–06 |
| 1036.25 | 6 | 1052 | 7.15 | 0.7 | 51.07 | 9.3e–07 |
| 1379 | 6 | 1379 | 28.74 | 2.1 | 826.27 | 5.3e–07 |

Comparison of Tables 8 and 14 emphasizes the enhanced linear range of results, accuracy, and precision using specialized linearity samples prepared from the high, low, and seven intermediate concentration samples versus a linearity series prepared from whole blood and high, low, and three intermediate concentration samples. Using whole blood protocol yielded a higher deviation than when using special blood products protocol as described herein.

Linearity Control Slides

Data has been generated via methods using specialized blood products in combination with the gold standard verification protocols (Examples 1-3), and via methods using whole blood samples in combination with whole blood implementation protocols (Examples 4-6). Regardless of method chosen and AMI outcome, all 6 examples require investment of a significant amount of time, money, and technical expertise. Eliminating those obstacles is highly advantageous for customers.

Example 7: Comparison of Linearity Control Slides for RBC-HGB-HCT

The purpose of Example 7 was to compare the AMI of two Cobas® m 511 systems using linearity control slides. Parameter(s) RBC-HGB-HCT were selected to demonstrate feasibility of proof-of-principle.

The linearity dilutions were prepared and processed on Cobas® m 511 system C4 using (gold standard) methods previously described in Example 2. The counts for RBC-HGB-HCT were obtained. The linearity control slides resulting from the gold standard RBC method were retained. Printing and staining functions of the same Cobas® m 511 system C4 were then temporarily reconfigured.

Figure 6A:
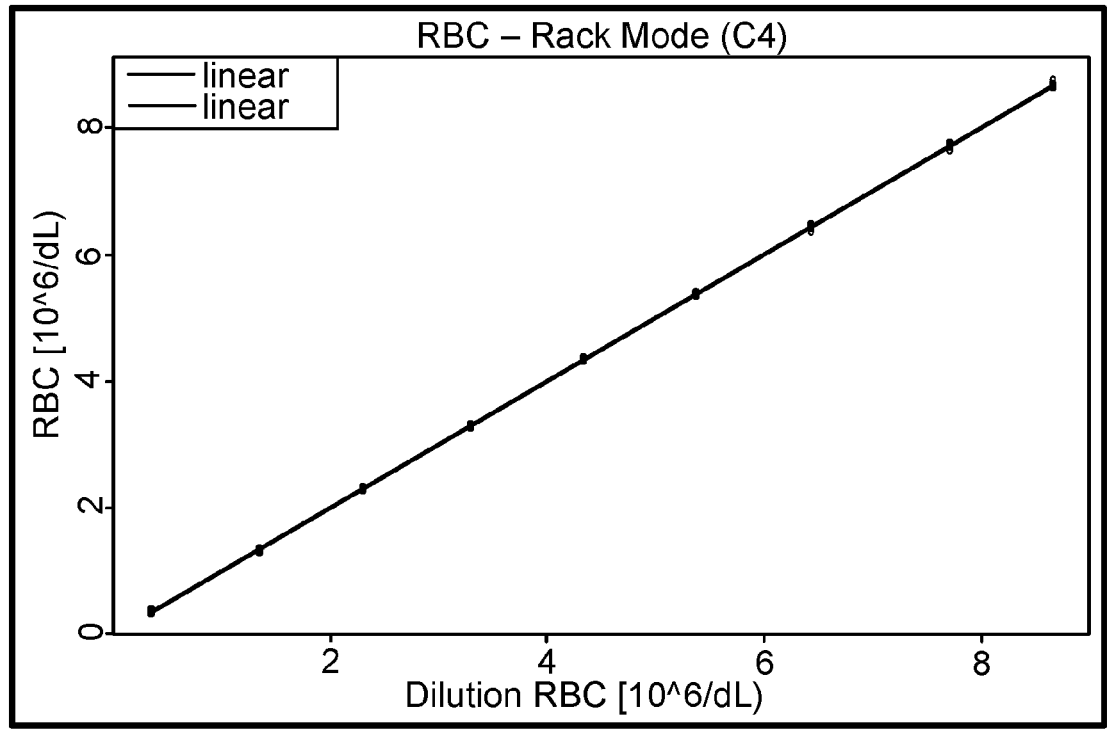
FIG. 6A is a representative graph of RBC analytical measuring interval (linearity) initially processed by a first Cobas® m 511 system identified as C4, using high, low, and intermediate concentration blood samples prepared as described herein and subsequently re-processed on the same Cobas® m 511 system (C4) using newly prepared RBC linearity control slides.
Figure 6B:
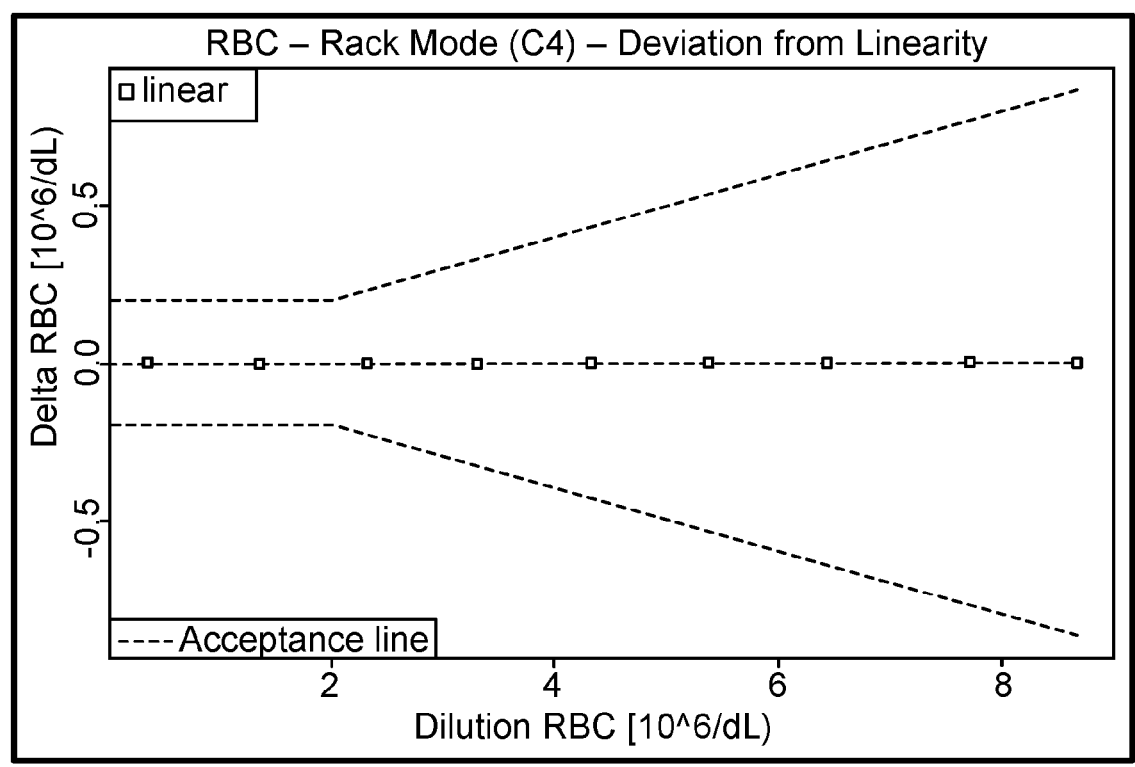
FIG. 6B is a representative graph of acceptable limits and RBC deviation from linearity calculated from the analytical measuring interval of FIG. 6A.
Figure 6C:
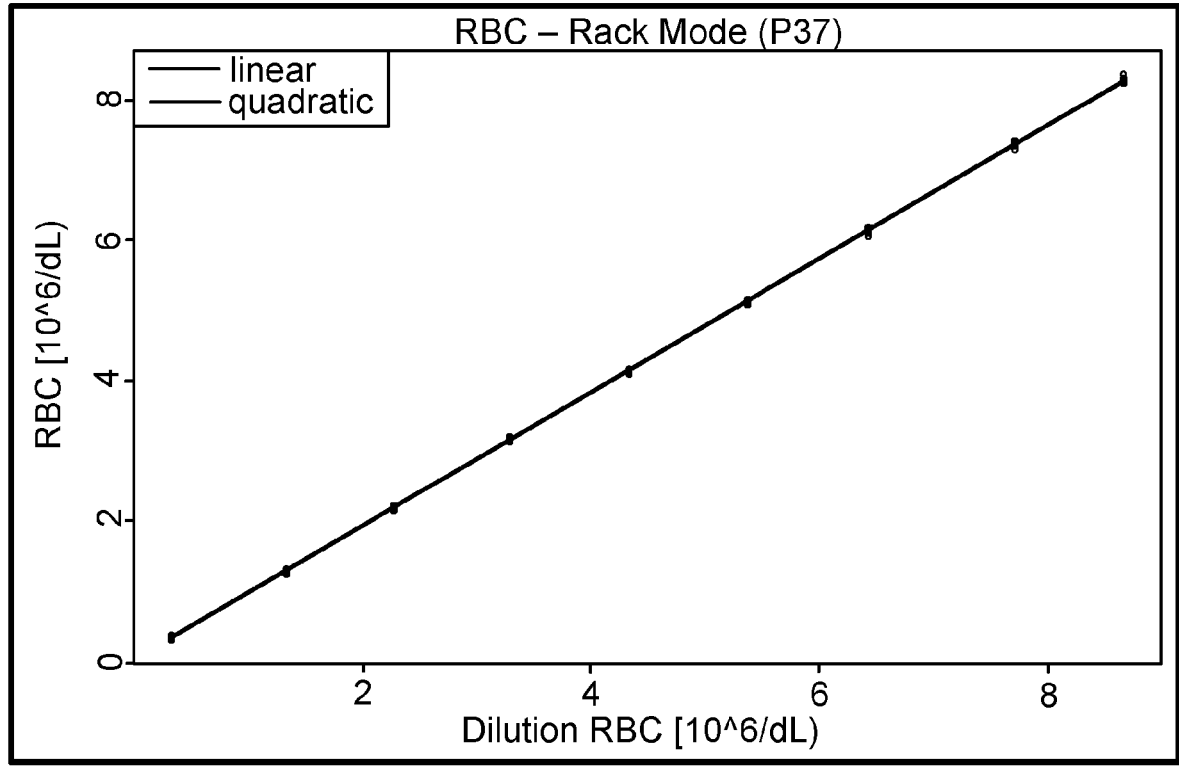
FIG. 6C is a representative graph of RBC analytical measuring interval (linearity) measured on a second Cobas® m 511 system P37, using linearity control slides created by Cobas® m 511 system identified as C4, described in FIG. 6A.
Figure 6D:
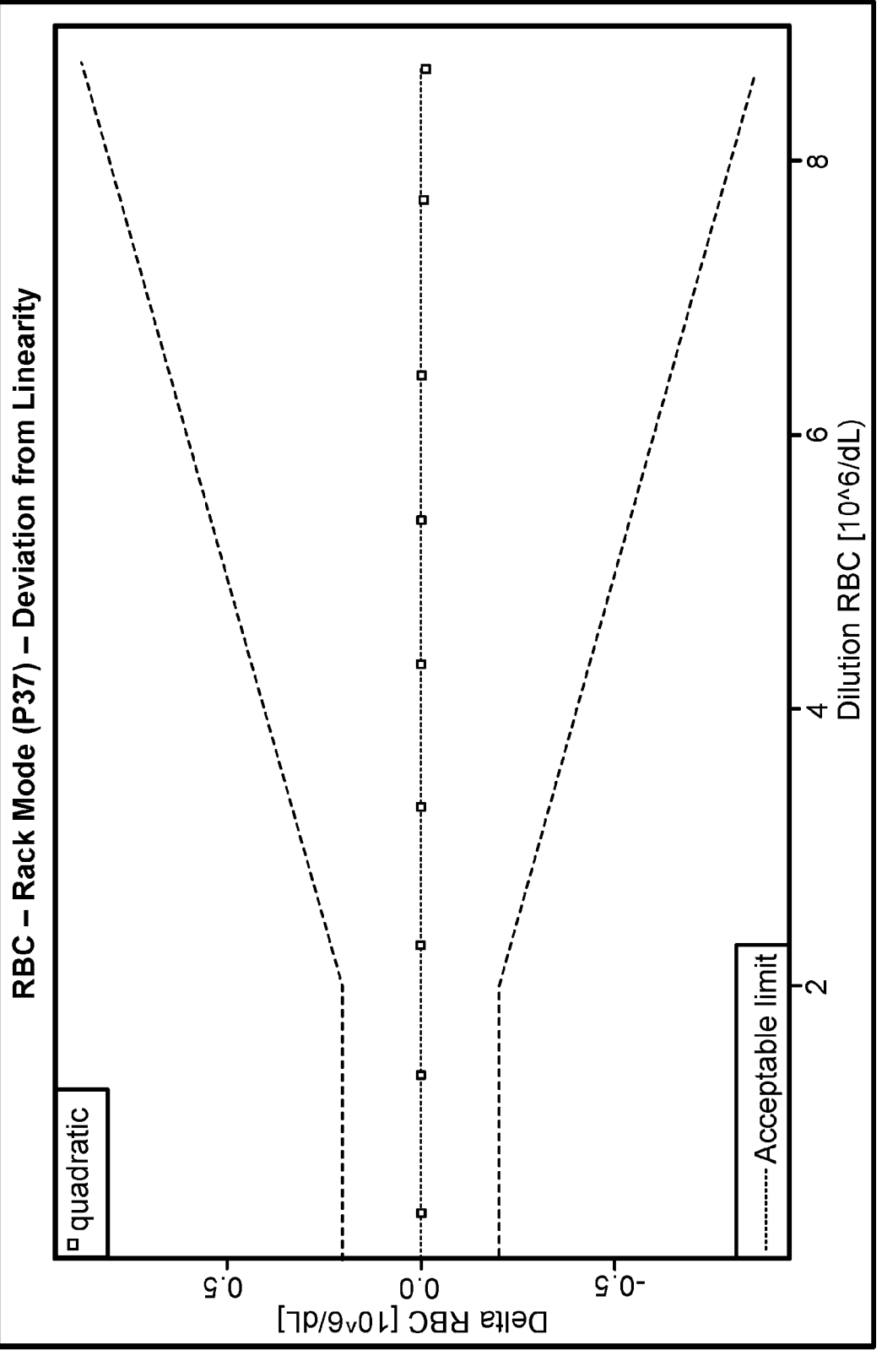
FIG. 6D is a representative graph of RBC deviation from linearity calculated from the analytical measuring interval of FIG. 6C.

The linearity control slides were then processed on two Cobas® m 511 systems: first on the same Cobas® m 511 system (C4), and then on a second Cobas® m 511 system (P37):

1) the linear range for RBC (from the linearity control slides) processed on the first Cobas® m 511 system is 0.35-8.66×$10^6$/μL and processed on the second Cobas® m 511 system is 0.34-8.30×$10^6$/μL as shown in FIGS. 6A and 6C, respectively, meeting the target values of ≤0.4-≥8.0×$10^6$/μL.

TABLE 15

| Linear Range for RBC (0% Deviation) | | | | | | |
|---|---|---|---|---|---|---|
| Target | Mean | SD | % CV | Deviation | % Deviation | Test |
| 0.35 | 0.35 | 0.011 | 3.13 | 0.000 | 0.00 | PASS |
| 1.35 | 1.35 | 0.023 | 1.74 | 0.000 | 0.00 | PASS |
| 2.30 | 2.30 | 0.028 | 1.20 | 0.000 | 0.00 | PASS |
| 3.30 | 3.30 | 0.010 | 0.30 | 0.000 | 0.00 | PASS |
| 4.33 | 4.33 | 0.020 | 0.45 | 0.000 | 0.00 | PASS |
| 5.38 | 5.38 | 0.031 | 0.58 | 0.000 | 0.00 | PASS |

TABLE 15-continued

| Linear Range for RBC (0% Deviation) | | | | | | |
|---|---|---|---|---|---|---|
| Target | Mean | SD | % CV | Deviation | % Deviation | Test |
| 6.43 | 6.43 | 0.054 | 0.84 | 0.000 | 0.00 | PASS |
| 7.71 | 7.71 | 0.050 | 0.65 | 0.000 | 0.00 | PASS |
| 8.66 | 8.66 | 0.060 | 0.70 | 0.000 | 0.00 | PASS |

2) the acceptable limits and RBC deviation from linearity (using the linearity control slides) was calculated on the first Cobas® m 511 system as 0% deviation for all concentrations, and ranged from –0.68% to 0.07% deviation on the second Cobas® m 511 system as shown in FIG. 6B (Table 15) and 6D (Table 16), respectively.

TABLE 16

| Linear Range for RBC (<1% Deviation) | | | | | | |
|---|---|---|---|---|---|---|
| Target | Mean | SD | % CV | Deviation | % Deviation | Test |
| 0.35 | 0.34 | 0.010 | 0.00 | –0.002 | –0.68 | PASS |
| 1.35 | 1.30 | 0.023 | 1.80 | 0.000 | 0.01 | PASS |
| 2.30 | 2.21 | 0.028 | 1.27 | 0.001 | 0.07 | PASS |
| 3.30 | 3.17 | 0.010 | 0.33 | 0.002 | 0.06 | PASS |
| 4.33 | 4.17 | 0.019 | 0.45 | 0.001 | 0.03 | PASS |
| 5.38 | 5.17 | 0.033 | 0.64 | –0.000 | –0.00 | PASS |
| 6.43 | 6.17 | 0.051 | 0.82 | –0.003 | –0.05 | PASS |
| 7.71 | 7.40 | 0.043 | 0.58 | –0.008 | –0.10 | PASS |
| 8.66 | 8.30 | 0.054 | 0.65 | –0.013 | –0.15 | PASS |

3) the linear range for HGB (from the linearity control slides) processed on the first Cobas® m 511 system is 1.08-26.02 g/dL and processed on the second Cobas® m 511 system, is 1.00-25.57 g/dL as shown in Table 17, meeting the target values of ≤1.2-≥24.0×g/dL.

TABLE 17

| Linear Range for HGB (0% Deviation) | | | | | | |
|---|---|---|---|---|---|---|
| Target | Mean | SD | % CV | Deviation | % Deviation | Test |
| 1.08 | 1.08 | 0.041 | 3.77 | 0.000 | 0.00 | PASS |
| 3.97 | 3.97 | 0.082 | 2.06 | 0.000 | 0.00 | PASS |
| 6.75 | 6.75 | 0.105 | 1.55 | 0.000 | 0.00 | PASS |
| 9.67 | 9.67 | 0.052 | 0.53 | 0.000 | 0.00 | PASS |
| 12.72 | 12.72 | 0.075 | 0.59 | 0.000 | 0.00 | PASS |
| 15.83 | 15.83 | 0.163 | 1.03 | 0.000 | 0.00 | PASS |
| 18.95 | 18.95 | 0.138 | 0.73 | 0.000 | 0.00 | PASS |
| 22.88 | 22.88 | 0.133 | 0.58 | 0.000 | 0.00 | PASS |
| 26.02 | 26.02 | 0.286 | 1.10 | 0.000 | 0.00 | PASS |

4) the acceptable limits and HGB deviation from linearity (using the linearity control slides) was calculated on the first Cobas® m 511 system as 0% deviation for all concentrations, and ranged from –0.35% to 2.71% deviation on the second Cobas® m 511 system as shown in Table 18.

TABLE 18

| Linear Range for HGB (<3% Deviation) | | | | | | |
|---|---|---|---|---|---|---|
| Target | Mean | SD | % CV | Deviation | % Deviation | Test |
| 1.08 | 1.00 | 0.052 | 0 | 0.029 | 2.71 | PASS |
| 3.97 | 3.82 | 0.075 | 1.97 | 0.022 | 0.55 | PASS |
| 6.75 | 6.48 | 0.098 | 1.52 | 0.001 | 0.01 | PASS |
| 9.67 | 9.33 | 0.052 | 0.55 | –0.025 | –0.25 | PASS |

TABLE 18-continued

Linear Range for HGB (<3% Deviation)

| Target | Mean | SD | % CV | Deviation | % Deviation | Test |
|--------|-------|-------|------|-----------|-------------|------|
| 12.72 | 12.28 | 0.075 | 0.61 | −0.044 | −0.35 | PASS |
| 15.83 | 15.28 | 0.133 | 0.87 | −0.045 | −0.28 | PASS |
| 18.95 | 18.45 | 0.138 | 0.75 | −0.013 | −0.07 | PASS |
| 22.88 | 22.33 | 0.137 | 0.61 | 0.094 | 0.41 | PASS |
| 26.02 | 25.57 | 0.250 | 0.98 | 0.247 | 0.95 | PASS |

5) the linear range for HCT (from the linearity control slides) processed on the first Cobas® m 511 system is 3-79% and processed on the second Cobas® m 511 system is 3-78% as shown in Table 19, respectively, meeting the target values of ≤3.6-≥72.0%.

TABLE 19

Linear Range for HCT (0% Deviation)

| Target | Mean | SD | % CV | Deviation | % Deviation | Test |
|--------|-------|-------|------|-----------|-------------|------|
| 3.00 | 3.00 | 0.001 | 2.34 | 0.000 | 0.00 | PASS |
| 12.00 | 12.00 | 0.002 | 1.99 | 0.000 | 0.00 | PASS |
| 21.00 | 21.00 | 0.002 | 0.99 | 0.000 | 0.00 | PASS |
| 30.00 | 30.00 | 0.001 | 0.40 | 0.000 | 0.00 | PASS |
| 40.00 | 40.00 | 0.002 | 0.42 | 0.000 | 0.00 | PASS |
| 49.00 | 49.00 | 0.004 | 0.78 | 0.000 | 0.00 | PASS |
| 59.00 | 59.00 | 0.006 | 0.99 | 0.000 | 0.00 | PASS |
| 71.00 | 71.00 | 0.007 | 1.01 | 0.000 | 0.00 | PASS |
| 79.00 | 79.00 | 0.006 | 0.80 | 0.000 | 0.00 | PASS |

6) the acceptable limits and HCT deviation from linearity (using the linearity control slides) was calculated on the first Cobas® m 511 system as 0% deviation for all concentrations, and ranged from −0.10% to 0.95% deviation on the second Cobas® m 511 system as shown in Table 20.

TABLE 20

Linear Range for HCT (<1% Deviation)

| Target | Mean | SD | % CV | Deviation | % Deviation | Test |
|--------|-------|-------|------|-----------|-------------|------|
| 3.00 | 3.00 | 0.001 | 1.60 | 0.000 | 0.28 | PASS |
| 12.00 | 12.00 | 0.002 | 2.00 | 0.000 | 0.09 | PASS |
| 21.00 | 20.00 | 0.003 | 1.39 | −0.000 | −0.10 | PASS |
| 30.00 | 29.00 | 0.002 | 0.60 | −0.001 | −0.20 | PASS |
| 40.00 | 39.00 | 0.002 | 0.48 | −0.001 | −0.20 | PASS |
| 49.00 | 48.00 | 0.004 | 0.79 | −0.000 | −0.09 | PASS |
| 59.00 | 57.00 | 0.005 | 0.92 | 0.001 | 0.13 | PASS |
| 71.00 | 69.00 | 0.006 | 0.87 | 0.004 | 0.54 | PASS |
| 79.00 | 78.00 | 0.009 | 1.18 | 0.008 | 0.95 | PASS |

The linearity control slides, prepared from specialized high, low, and intermediate concentration samples as described herein provide comparable correlation to freshly prepared linearity samples from specialized high, low, and intermediate concentration samples.

Additionally, linearity control slides prepared, as described, provide decreased variability, increased reproducibility and achieve the entire AMI compared to linearity samples prepared from whole blood samples. Comparison of Tables 13 and 16 emphasizes the enhanced accuracy, precision, and instrument-to-instrument standardization from the linearity control slides based on the linearity samples prepared from the high and low concentration blood samples. Deviation while using specialized blood products was consistent when measured on two Cobas® m 511 systems.

Lastly, since the linearity control slides are created/generated by the manufacturer, the time and cost savings to the customer are significant.

Example 8: Stability of Linearity Control Slides

This study was conducted to demonstrate that Cobas® m 511 system slides stored for 30 days produce similar results compared to original (baseline) results, with respect to manual microscopic reviews for the WBC differential and morphology. The results from all evaluations performed during this study were successful and met predefined acceptance criteria. This demonstrates that slides generated by the Cobas® m 511 system are stable for manual microscopic review for a minimum of 30 days up to 180 days.

To verify Cobas® m 511 slide stability performance, the protocol was performed using at least twenty (20) samples collected in K2 EDTA collection tubes, and processed on a SYSMEX® Automated Hematology Analyzer. The samples consisted of:

six (6) random residual whole blood samples five (5) normal healthy donors nine (9) targeted residual whole blood samples; three (3) each from each of the following categories:

Anemia HGB 6-10 g/dL

Leukopenia WBC ≤2×10³/µL

Thrombocytopenia PLT ≤50×10³/µL

Each sample was processed in triplicate in rack mode on one (1) Cobas® m 511 system within eight (8) hours of sample collection. The Cobas® m 511 system slides created by the Cobas® m 511 system were evaluated by a qualified Medical Technologist (MT) at baseline, after a minimum of thirty (30) days, and again after a minimum of one-hundred eighty (180) days.

The evaluation consisted of five (5) separate analyses. None of the individual evaluations is required to meet a specific PSD requirement; rather, the combined set of results will be used to determine slide stability.

1—Red Blood Cell Inclusions: Present/Not Present: report % agreement

2—WBC, RBC, and PLT Morphology: Grading 1-4+: report % agreement

3—WBC Diff Parameters Bias Assessment: report % bias

4—WBC Diff Parameters Regression Analysis: report slope and intercept

5—Macroscopic Slide Characteristics: Peeling, Flaking, Print, Color Fading: Grading 1-3+: report % agreement The slide assessment of the first replicate (baseline) for each sample processed on the Cobas® m 511 system occurred within eight (8) hours of sample processing. The remaining slides for each sample were stored in Fisher Scientific Slide storage boxes for the remainder of the study at room temperature (15°-25° C.). After one-hundred eighty (180) days, a qualified Medical Technologist (MT) assessed one (1) of the remaining two (2) slides. Following assessment, the Cobas® m 511 system slides were placed back into the slide storage boxes.

Cell characteristics (RBC Inclusions and WBC, RBC, and PLT morphology) exhibit no difference between zero (0) and thirty (30) days nor zero (0) and one-hundred eighty (180) days. Percent bias and correlation coefficients for the 5-part WBC diff are acceptable and lastly, macroscopic assessments of Cobas® m 511 slides indicate no observations of sample peeling, sample flaking or change in print uniformity, and only a slight change in color (fading) when comparing baseline results to results obtained after at least thirty (30) days in storage and one hundred-eighty (180) days in storage.

This protocol demonstrated that slides generated by the Cobas® m 511 system are stable for a minimum of one-hundred eighty (180) days.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A set of linearity control slides for verifying the analytical measuring interval (AMI) or reportable range, or both, of a hematology analyzer comprising at least one, two, three, four, or all five, of:
   a first set of slides for combined red blood cell (RBC) hemoglobin (HGB) and hematocrit (HCT) components;
   a second set of slides for a white blood cell (WBC) component;
   a third set of slides for a platelet (PLT) component
   a fourth set of slides for a reticulocyte (RET) component; and
   a fifth set of slides for a nucleated red blood cell (NRBC) component;
   wherein each set of slides includes three or more slides,
   wherein each slide in the set of slides contains a different concentration of the blood component to provide a series of equidistant dilutions within a range of concentrations of the blood component of that set of slides, and
   wherein blood components on each slide in the set of slides are fixed and stained by a hematology analyzer.

2. The set of linearity control slides of claim 1, wherein the set is stable without refrigeration for at least six months.

3. The set of linearity control slides of claim 1, wherein staining comprises use of an eosin solution or a methylene blue solution.

4. The set of linearity control slides of claim 1, comprising at least the first (RBC), second (WBC), and third (PLT) sets of slides, wherein the first, second, and third sets of slides include the following high concentrations and low concentrations of the respective types of cells:

| Parameter | Low Concentration Linearity Samples | High Concentration Linearity Samples |
|---|---|---|
| WBC | $\leq 0.1 \times 10^3/\mu L$ $> 1.5 \times 10^6/\mu L$ RBC* | $\geq 400 \times 10^3/\mu L$ |
| PLT | $\leq 10 \times 10^3/\mu L$ $> 1.5 \times 10^6/\mu L$ RBC* | $\geq 5000 \times 10^3/\mu L$ |
| RBC | $\leq 0.4 \times 10^6/\mu L$ | $\geq 8.0 \times 10^6/\mu L$. |

5. The set of linearity control slides of claim 1, wherein the hematology analyzer is an image-based hematology analyzer.

6. A method of verifying linearity of enumeration of a blood component by an image-based hematology analyzer in an extended concentration range, the method comprising:

obtaining a set of linearity control slides of claim 1 for a blood component;
   analyzing the set of linearity control slides with the image-based hematology analyzer using a standard protocol for the blood component;
   obtaining enumeration values for each blood component from the image-based hematology analyzer; and
   determining linearity of the blood component enumeration using the enumeration values and a known target range for the blood component for the image-based hematology analyzer.

7. The method of claim 6, further comprising obtaining a set of linearity control slides for two or more blood components.

8. A method of producing a set of linearity control slides for verifying linearity on a hematology analyzer with respect to one or more blood components, the method comprising:
   obtaining a whole blood sample or a blood product sample comprising one or more blood components from a healthy human subject;
   preparing a high concentration sample from the whole blood sample or blood product sample for a first blood component;
   preparing a low concentration sample from the whole blood sample or blood product sample for the first blood component;
   preparing a plurality of equidistant dilutions for the first blood component, wherein the plurality of equidistant dilutions comprises the high concentration sample, the low concentration sample, a first dilution comprising one part of the high concentration sample and one part of the low concentration sample, a second dilution comprising one part of the first dilution and one part of the low concentration sample, and a third dilution comprising one part of the first dilution and one part of the high concentration sample; and
   preparing a slide for each of the plurality of equidistant dilutions by processing each of the equidistant dilutions for the first blood component in an image-based hematology analyzer to print, fix, and stain the equidistant dilution onto a slide.

9. The method of claim 8, wherein the high concentration sample and the low concentration sample originate from the same blood sample.

10. The method of claim 8, wherein the high concentration sample and the low concentration sample each comprises a predetermined concentration of the first component.

11. The method of claim 8, wherein the first blood component is selected from a group consisting of red blood cells (RBC), white blood cells (WBC), platelets (PLT), reticulocytes (RET), and nucleated red blood cells (NRBC).

12. The method of claim 11, wherein the first blood component is RBCs and wherein the high concentration sample is $\geq 8.0 \times 10^6/\mu L$ of RBCs and the low concentration sample is $\leq 0.4 \times 10^6/\mu L$ of RBCs.

13. The method of claim 11, wherein the first blood component is WBCs, and wherein the high concentration sample is $\geq 400 \times 10^3/\mu L$ of WBCs and the low concentration sample is $\leq 0.1 \times 10^3/\mu L$ of WBCs.

14. The method of claim 13, wherein the low concentration sample of WBCs further comprises greater than $1.5 \times 10^6/\mu L$ RBCs.

15. The method of claim 11, wherein the first blood component is PLTs, and wherein the high concentration sample is $\geq 5000 \times 10^3/\mu L$ of PLTs and the low concentration sample is less than or equal to $\leq 10 \times 10^3/\mu L$ of PLTs.

16. The method of claim 15, wherein the low concentration sample of PLTs further comprises greater than $1.5 \times 10^6/$ μL RBCs.

17. The method of claim 8, further comprising conducting each of the recited steps for a second blood component to produce a second set of linearity control slides for the second blood component.

18. The method of claim 17, wherein the second blood component is selected from a group consisting of RBC, WBC, PLT, RET, and NRBC.

19. The method of claim 8, wherein the plurality of equidistant dilutions is each processed on two, three, four, five, or six slides.

20. The method of claim 8, wherein the plurality of equidistant dilutions further comprises a fourth dilution comprising one part of the low concentration blood sample and one part of the second dilution, a fifth dilution comprising one part of the second dilution and one part the first dilution, a sixth dilution comprising one part of the first dilution and one part of the third dilution, and a seventh dilution comprising one part of the high concentration blood sample and one part of the third dilution.

* * * * *